(12) United States Patent
Huang et al.

(10) Patent No.: US 12,302,431 B2
(45) Date of Patent: *May 13, 2025

(54) MULTI-LINK ESTABLISHMENT METHOD AND COMMUNICATION APPARATUS

(71) Applicant: HUAWEI TECHNOLOGIES CO., LTD., Guangdong (CN)

(72) Inventors: Guogang Huang, Shenzhen (CN); Yunbo Li, Shenzhen (CN); Ming Gan, Shenzhen (CN); Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,537

(22) Filed: Mar. 14, 2024

(65) Prior Publication Data

US 2024/0306234 A1   Sep. 12, 2024

Related U.S. Application Data

(63) Continuation of application No. 18/300,406, filed on Apr. 14, 2023, now Pat. No. 11,974,342, which is a (Continued)

(30) Foreign Application Priority Data

Jul. 3, 2020   (CN) .......................... 202010632127.0

(51) Int. Cl.
*H04W 76/15* (2018.01)
*H04L 1/1607* (2023.01)
*H04W 88/08* (2009.01)

(52) U.S. Cl.
CPC ........... *H04W 76/15* (2018.02); *H04L 1/1614* (2013.01); *H04W 88/08* (2013.01)

(58) Field of Classification Search
CPC . H04W 8/005; H04W 48/16; H04W 72/0426; H04W 72/0446
See application file for complete search history.

(56) References Cited

U.S. PATENT DOCUMENTS

| | | | |
|---|---|---|---|
| 11,540,200 | B2 | 12/2022 | Chu et al. |
| 2003/0235180 | A1 | 12/2003 | Oprescu-Surcobe et al. |

(Continued)

FOREIGN PATENT DOCUMENTS

| | | |
|---|---|---|
| CN | 101803294 A | 8/2010 |
| CN | 106559903 A | 4/2017 |

(Continued)

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, 3534 pages.

(Continued)

Primary Examiner — Syed Ali

(57) ABSTRACT

This application discloses a multi-link establishment method and a related device. A multi-link association response frame carries radio bitmap information, to indicate an AP allowed to be associated with a radio of a STA MLD or a link allowed to be established by using a radio of a STA MLD, so that the radio subsequently switches between different APs or links. The multi-link association response frame carries link establishment status information, to indicate a link establishment status of each link that the STA MLD requests to establish, so that multi-link establishment is more flexible. The multi-link association response frame carries reassociation information, to indicate whether each parameter in association configuration information is reserved, so that a problem that signaling overheads are relatively large due to a reassocia- (Continued)

Communication system 100 tion operation is avoided. It can be learned that, in the multi-link establishment method, the foregoing information is carried to improve multi-link establishment flexibility.

16 Claims, 19 Drawing Sheets

Related U.S. Application Data continuation of application No. 17/946,719, filed on Sep. 16, 2022, now Pat. No. 11,672,041, which is a continuation of application No. PCT/CN2021/104115, filed on Jul. 1, 2021.

(56) References Cited

U.S. PATENT DOCUMENTS

| | | | |
|---|---|---|---|
| 2017/0135013 A1 | 5/2017 | Panecki et al. | |
| 2017/0180981 A1 | 6/2017 | Lin et al. | |
| 2018/0205502 A1 | 7/2018 | Merlin et al. | |
| 2019/0150214 A1 | 5/2019 | Zhou et al. | |
| 2019/0335454 A1 | 10/2019 | Huang et al. | |
| 2021/0037583 A1 | 2/2021 | Seok et al. | |
| 2021/0100051 A1 | 4/2021 | Ho et al. | |
| 2021/0266931 A1* | 8/2021 | Kwon | H04W 60/005 |
| 2021/0321410 A1 | 10/2021 | Patil et al. | |
| 2021/0368322 A1* | 11/2021 | Seok | H04W 12/041 |
| 2021/0377928 A1 | 12/2021 | Seok et al. | |
| 2022/0061051 A1* | 2/2022 | Song | H04W 72/0453 |
| 2022/0110119 A1* | 4/2022 | Song | H04L 5/001 |
| 2022/0191291 A1* | 6/2022 | Zuo | H04L 67/146 |
| 2022/0225406 A1 | 7/2022 | Kim et al. | |
| 2022/0264429 A1 | 8/2022 | Gan et al. | |
| 2022/0272777 A1 | 8/2022 | Guo et al. | |
| 2022/0286228 A1 | 9/2022 | Song et al. | |
| 2022/0287121 A1 | 9/2022 | Hwang et al. | |
| 2022/0416983 A1 | 12/2022 | Song et al. | |
| 2023/0007535 A1 | 1/2023 | Kim et al. | |
| 2023/0007572 A1 | 1/2023 | Patil et al. | |
| 2023/0103807 A1 | 4/2023 | Park et al. | |
| 2023/0156633 A1* | 5/2023 | Hirata | H04W 72/0446 370/350 |
| 2023/0188278 A1 | 6/2023 | Jang et al. | |
| 2023/0224814 A1 | 7/2023 | Kim et al. | |
| 2023/0224989 A1 | 7/2023 | Kim et al. | |

FOREIGN PATENT DOCUMENTS

| | | |
|---|---|---|
| CN | 110168947 A | 8/2019 |
| CN | 110199494 A | 9/2019 |
| CN | 111066271 A | 4/2020 |
| CN | 111096044 A | 5/2020 |
| JP | 2017501608 A | 1/2017 |
| RU | 2712122 C1 | 1/2020 |
| WO | 2015069875 A1 | 5/2015 |
| WO | 2019177615 A1 | 9/2019 |
| WO | 2020033732 A1 | 2/2020 |

OTHER PUBLICATIONS

IEEE 802.11-20/0030r0, Guogang Huang et al., Multi-link Association Follow Up, Jan. 2020, 10 pages.

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.

* cited by examiner status code: Status code;
multi-link element: Multi-link element;
element ID: Element identifier;
length: Length;
MLD-level info: Multi-link device information;
non-transmitted link profile info: Non-transmitted link configuration information;
link: Link

MULTI-LINK ESTABLISHMENT METHOD AND COMMUNICATION APPARATUS

CROSS-REFERENCE TO RELATED APPLICATIONS

This application is a continuation of U.S. patent application Ser. No. 18/300,406, filed on Apr. 14, 2023, which is a continuation of U.S. patent application Ser. No. 17/946,719, filed on Sep. 16, 2022, which is a continuation of International Application No. PCT/CN2021/104115, filed on Jul. 1, 2021, which claims priority to Chinese Patent Application No. 202010632127.0, filed on Jul. 3, 2020. All of the afore-mentioned patent applications are hereby incorporated by reference in their entireties.

TECHNICAL FIELD

This application relates to the field of communication technologies, and in particular, to a multi-link establishment method and a communication apparatus.

BACKGROUND

An IEEE 802.11ax next-generation wireless-fidelity (Wi-Fi), that is, extremely high throughput (EHT) device aggregates a plurality of discontinuous links by using a multi-link cooperation technology, to form an ultra-high bandwidth. In addition to aggregating a higher bandwidth, the multi-link cooperation technology may further be used to simultaneously send a data packet of a same service to a same station. It can be learned that the multi-link cooperation technology greatly improves a transmission rate.

A station multi-link device (STA MLD) may establish a plurality of links to an access point multi-link device (AP MLD) by using one link. A multi-link association request frame or a multi-link association response frame in the multi-link establishment operation carries information about the plurality of links, to establish the plurality of links.

Currently, for a single-link device, for example, a station (STA) and an access point (AP), in a process in which the STA associates with the AP, a status code field in an association response frame may be used to indicate whether the STA is successfully associated with the AP. However, for a multi-link device, if only the status code field is used to indicate successful association between multi-link devices, a specific establishment status of each link cannot be learned. As a result, multi-link establishment flexibility is relatively low.

SUMMARY

A multi-link establishment method and a communication apparatus provided in this application help improve multi-link establishment flexibility.

According to a first aspect, this application discloses a multi-link establishment method. The method includes: A STA MLD sends a multi-link association request frame; and the STA MLD receives a multi-link association response frame, where the multi-link association response frame carries radio bitmap information, and the radio bitmap information is used to indicate a radio, allowed to be used to establish each link that the STA MLD requests to establish, of the STA MLD.

According to a second aspect, this application discloses a multi-link establishment method. The method corresponds to the first aspect, and is described from a perspective of an AP MLD. The method includes: The AP MLD receives a multi-link association request frame; and the AP MLD sends a multi-link association response frame, where the multi-link association response frame carries radio bitmap information, and the radio bitmap information is used to indicate a radio, allowed to be used to establish each link that a STA MLD requests to establish, of the STA MLD.

It can be learned that, both the multi-link establishment methods described in the two aspects help the AP MLD notify the STA MLD of the radio, allowed to be used to establish each link that the STA MLD requests to establish, of the STA MLD. Further, this helps determine, when there is no radio allowed to be used for the link, that the link fails to be established; or determine, when there is the radio allowed to be used for the link, that the link is successfully established. When a same radio is allowed to be used to establish a plurality of links, the radio can perform fast link switching between the plurality of links, thereby avoiding a problem of a relatively long delay caused by reestablishing the link, and improving multi-link establishment flexibility.

In other words, if the radio bitmap information indicates that a radio, allowed to be used to establish one link that the STA MLD requests to establish, of the STA MLD does not exist or is zero, it implicitly indicates that the link fails to be established. If the radio bitmap information indicates that there is one radio, allowed to be used to establish one link that the STA MLD requests to establish, of the STA MLD, it implicitly indicates that the link is successfully established. If the radio bitmap information indicates that there are a plurality of radios, allowed to be used to establish one link that the STA MLD requests to establish, of the STA MLD, it implicitly indicates that the link is successfully established, and the plurality of radios may all switch to the link.

Optionally, if the radio bitmap information indicates that a same radio of the STA MLD is allowed to be used to establish a plurality of links that the STA MLD requests to establish, it implicitly indicates that the radio may be used to establish the plurality of links, and may perform link switching between the plurality of links. It can be learned that, in the multi-link establishment method, whether link establishment succeeds is indicated, and the plurality of links may further be established for the same radio, to help the radio perform fast switching between the plurality of links, thereby avoiding a problem of a relatively large delay caused due to switching performed after a link is subsequently re-established.

The following describes optional implementations for the multi-link establishment methods described in the first aspect and the second aspect.

Descriptions of the radio bitmap information may further include but are not limited to the following types: The radio bitmap information is used to indicate an AP that each radio of the STA MLD is allowed to be associated with and that is in the AP MLD; or a link that is allowed to share each radio of the STA MLD; or a link that each radio of the STA MLD is allowed to be used to establish; or a radio that each AP in the AP MLD is allowed to be associated with and that is of the STA MLD. In the several description manners, information such as whether each link is successfully established, a plurality of links between which each radio is allowed to switch, and whether a radio is available may also be learned. Details are not described herein.

In this implementation, the radio bitmap information indicates a correspondence between each link and each radio of the STA MLD, or a correspondence between each AP in the AP MLD and each radio of the STA MLD. Therefore, in this implementation, the radio bitmap information may be carried in multi-link device information in a multi-link element. Optionally, the radio bitmap information may alternatively be carried in the multi-link association response frame in a form of an independent field.

In addition, a total quantity of bits occupied by the radio bitmap information=a product of a quantity of radios of the STA MLD and a quantity of APs in the AP MLD. Alternatively, a total quantity of bits occupied by the radio bitmap information=a product of a quantity of radios of the STA MLD and a quantity of links that the STA MLD requests to establish. It can be learned that radio quantity information carried in the multi-link association request frame helps determine the quantity of bits of the radio bitmap information or a length of the radio bitmap information.

In this implementation, the radio bitmap information may be carried in the MLD-level info in the multi-link element.

In another implementation, the multi-link association response frame carries a plurality of pieces of radio bitmap information, one piece of radio bitmap information corresponds to one link that a STA MLD requests to establish, and the radio bitmap information is used to indicate a radio, allowed to be used to establish the corresponding link, of the STA MLD. It can be learned that this implementation helps the AP MLD notify the STA MLD of the radio, allowed to be used to establish each link that the STA MLD requests to establish, of the STA MLD. Further, if radio bitmap information of one link indicates that a radio, allowed to be used, of the STA MLD does not exist or is zero, it implicitly indicates that the link fails to be established. If radio bitmap information of one link indicates that there is one radio, allowed to be used, of the STA MLD, it implicitly indicates that the link is successfully established. If radio bitmap information of one link indicates that there are a plurality of radios, allowed to be used, of the STA MLD, it implicitly indicates that the link is successfully established, and the plurality of radios may all switch to the link.

Optionally, if radio bitmap information of a plurality of links separately indicates a same radio, allowed to be used, of the STA MLD, it implicitly indicates that the radio may be used to establish the plurality of links, and may perform link switching between the plurality of links.

It can be learned that, in this implementation, whether link establishment succeeds is indicated, and the plurality of links may further be established for the same radio, to help the radio perform fast switching between the plurality of links, thereby avoiding a problem of a relatively large delay caused due to switching performed after a link is subsequently re-established.

In this implementation, a total quantity of bits occupied by radio bitmap information of one link=a quantity of radios of the STA MLD.

In this implementation, radio bitmap information of a transmitted link that the STA MLD requests to establish is carried in multi-link device information in a multi-link element; and radio bitmap information of a non-transmitted link that the STA MLD requests to establish is carried in link configuration information of the non-transmitted link in the multi-link element. Alternatively, regardless of a transmitted link or a non-transmitted link, radio bitmap information of each link is carried in multi-link device information in a multi-link element. Optionally, radio bitmap information of each link is carried in the multi-link association response frame in a form of an independent field.

Optionally, the radio bitmap information in the foregoing implementation may alternatively be carried in the multi-link association request frame or a reassociation request frame, to notify the AP MLD of a correspondence between a radio requested by the STA MLD and a link, or a correspondence between a radio and an AP. Details are not described herein.

Optionally, the radio bitmap information in the foregoing implementation may alternatively be carried in a reassociation response frame, to notify the STA MLD of a correspondence between a radio allowed by the AP MLD and a link, or a correspondence between a radio and an AP. Details are not described herein.

Optionally, the multi-link association request frame or the reassociation request frame further carries radio quantity information, and the radio quantity information is used to indicate a quantity of radios of the STA MLD. Further, this helps determine a quantity of bits of total radio bitmap information of all links or a length of total radio bitmap information of all links, or helps determine a quantity of bits of radio bitmap information of each link or a length of radio bitmap information of each link.

For the foregoing multi-link establishment method, the reassociation response frame received by the STA MLD from the AP MLD may carry reassociation information, and the reassociation information is used to indicate whether each parameter in association configuration information is reserved. The AP MLD uses the reassociation information to enable the STA MLD to reserve a part of parameters, so that repeated transmission of the parameters in and after a reassociation operation can be avoided, thereby reducing signaling overheads.

Optionally, the association configuration information may be information, shared on a plurality of links, in a multi-link device. The AP MLD uses the reassociation information to enable the STA MLD to reserve a part of parameters, so that repeated transmission of the parameters in and after a reassociation operation can be avoided, thereby reducing signaling overheads.

Optionally, the association configuration information includes but is not limited to one or more of the following parameters: a block acknowledgment protocol, a sequence number, a packet number, a duplicate detection cache, a fragmentation and reassembly buffer, and a buffered media access control service data unit MSDU.

In an implementation, the reassociation information includes one bit. The bit corresponds to all parameters in the association configuration information, and is used to indicate whether all the parameters in the association configuration information are reserved.

In another implementation, the reassociation information includes a plurality of bits. One bit corresponds to one parameter in the association configuration information, and is used to indicate whether the corresponding parameter is reserved.

In still another implementation, the reassociation information includes a plurality of bits. One bit corresponds to one or more parameters in the association configuration information, and is used to indicate whether the corresponding one or more parameters are reserved.

In still another implementation, the reassociation information includes a plurality of bits. One bit corresponds to a plurality of parameters in the association configuration information, and is used to indicate whether the corresponding plurality of parameters are reserved.

Optionally, the reassociation information is carried in multi-link device information in a multi-link element in the reassociation response frame. Alternatively, the reassociation information is carried in the reassociation response frame in a form of an independent field.

According to a third aspect, this application discloses a multi-link establishment method. The method includes: A STA MLD sends a multi-link association request frame; and the STA MLD receives a multi-link association response frame, where the multi-link association response frame carries link establishment status information, and the link establishment status information is used to indicate a link establishment status of each link that the STA MLD requests to establish. It can be learned that, in the multi-link establishment method, the STA MLD may learn of the link establishment status of each link based on the link establishment status information, that is, a link fails to be established is allowed to exist in the links that the STA MLD requests to establish, thereby improving multi-link establishment flexibility.

According to a fourth aspect, this application discloses a multi-link establishment method. The method is described from a perspective of an AP MLD. The method includes: An AP MLD receives a multi-link association request frame; and the AP MLD sends a multi-link association response frame, where the multi-link association response frame carries link establishment status information, and the link establishment status information is used to indicate a link establishment status of each link that a STA MLD requests to establish. It can be learned that, in the multi-link establishment method, the AP MLD may indicate the link establishment status of each link. A link fails to be established is allowed to exist in the links that the STA MLD requests to establish, thereby improving multi-link establishment flexibility.

The following describes optional implementations for the multi-link establishment methods described in the third aspect and the fourth aspect.

In an implementation, the link establishment status information includes a status code field and link configuration information of a successfully established link in the links that the STA MLD requests to establish. The status code field is used to indicate that the STA MLD is successfully associated with the AP MLD. The AP MLD may use this implementation to enable the STA MLD to learn that a link whose link configuration information is carried in the multi-link association response frame is a successfully established link. A link fails to be established is allowed to exist in the links that the STA MLD requests to establish, thereby improving multi-link establishment flexibility. In addition, the multi-link association response frame does not need to carry link configuration information of a link that fails to be established. It can be learned that, in this implementation, signaling overheads can further be reduced.

Optionally, if in this implementation, the status code field indicates that the STA MLD fails to be associated with the AP MLD, the multi-link association response frame may not carry the link configuration information of the link.

In another implementation, the link establishment status information includes a status code field and link configuration information of a successfully established link in the links that the STA MLD requests to establish. The status code field is used to indicate that a part of the links that the STA MLD requests to establish are successfully established. The AP MLD may use this implementation to enable the STA MLD to learn that a link whose link configuration information is carried in the multi-link association response frame is a successfully established link. A link fails to be established is allowed to exist in the links that the STA MLD requests to establish, thereby improving multi-link establishment flexibility.

Optionally, the status code field indicates that all the links that the STA MLD requests to establish are successfully established. The link establishment status information may include link configuration information of all the links that the STA MLD requests to establish.

In still another implementation, the link establishment status information includes a status code field and link configuration information of a successfully established non-transmitted link in the links that the STA MLD requests to establish. The status code field is used to indicate that a transmitted link in the links that the STA MLD requests to establish is successfully established. Optionally, when the status code field indicates that the transmitted link in the links that the STA MLD requests to establish fails to be established, the link establishment status information may further include link configuration information of the successfully established non-transmitted link in the links that the STA MLD requests to establish. It can be learned that, in this implementation, a link fails to be established is allowed to exist in the links that the STA MLD requests to establish, thereby improving multi-link establishment flexibility.

In the foregoing optional implementation, the status code field may be carried in the multi-link association response frame in a form of an independent field, the link configuration information of the successfully established transmitted link may be carried in multi-link device information in a multi-link element in the multi-link association response frame, and the link configuration information of the successfully established non-transmitted link may be carried in the link configuration information of each link in the multi-link element in the multi-link association response frame. Optionally, the status code field and the successfully established link may alternatively be carried in another position in the multi-link association response frame.

In still another implementation, the link establishment status information includes a plurality of status code fields. One status code field corresponds to one link that the STA MLD requests to establish, and is used to indicate a link establishment status of the corresponding link. It can be learned that, in this implementation, each link corresponds to one status code field. Not only whether the corresponding link is successfully established may be indicated, to improve multi-link establishment flexibility, but another status of link establishment can also be indicated.

In addition, a manner in which the link establishment status information is carried in the multi-link association response frame includes but is not limited to the following two types. In an implementation, in the links that the STA MLD requests to establish, a status code field of a transmitted link is carried in multi-link device information in a multi-link element, and a status code field of a non-transmitted link is carried in link configuration information of the non-transmitted link in the multi-link element. In another implementation, in the links that the STA MLD requests to establish, status code fields of the links are all carried in multi-link device information in a multi-link element.

In still another implementation, the link establishment status information includes a status code field and link establishment status bitmap information. The status code field is used to indicate that the STA MLD is successfully associated with the AP MLD, and the link establishment status bitmap information is used to indicate whether each link that the STA MLD requests to establish is successfully established. Optionally, if the status code field indicates that the STA MLD fails to be associated with the AP MLD, the link establishment status information may not carry the link establishment status bitmap information.

In still another implementation, the link establishment status information includes a status code field and link establishment status bitmap information. The status code field is used to indicate that a part of the links that the STA MLD requests to establish are successfully established, and the link establishment status bitmap information is used to indicate whether each link that the STA MLD requests to establish is successfully established. Optionally, if the status code field indicates that all the links that the STA MLD requests to establish are successfully established, the link establishment status information may not include the link establishment status bitmap information, or the link establishment status bitmap information included in the link establishment status information is all 1 (It is assumed that when a value of a bit corresponding to a link is 1, it indicates that the link is successfully established.). Optionally, if the status code field indicates that all the links that the STA MLD requests to establish fail to be established, the link establishment status information may not include the link establishment status bitmap information, or the link establishment status bitmap information included in the link establishment status information is all 0 (it is assumed that when a value of a bit corresponding to a link is 0, it indicates that the link fails to be established).

In still another implementation, the link establishment status information includes a status code field and link establishment status bitmap information. The status code field is used to indicate that a transmitted link in the links that the STA MLD requests to establish is successfully established, and the link establishment status bitmap information is used to indicate whether each non-transmitted link that the STA MLD requests to establish is successfully established. Optionally, if the status code field indicates that the transmitted link in the links that the STA MLD requests to establish fails to be established, the link establishment status information may still include the link establishment status bitmap information, to indicate whether each non-transmitted link is successfully established.

Optionally, the link establishment status information may alternatively be carried in a reassociation response frame, to indicate whether each link is successfully established in a reassociation process.

In addition, in the multi-link establishment method, the reassociation response frame may carry reassociation information, and the reassociation information is used to indicate whether each parameter in association configuration information is reserved. The association configuration information includes but is not limited to one or more of the following parameters: a block acknowledgment protocol, a sequence number, a packet number, a duplicate detection cache, a fragmentation and reassembly buffer, and a buffered media access control service data unit MSDU. Optionally, the association configuration information may be information, shared on a plurality of links, in a multi-link device. The reassociation information is used to reserve a part of parameters, so that repeated transmission of the parameters in and after a reassociation operation can be avoided, thereby reducing signaling overheads.

In an implementation, the reassociation information includes one bit. The bit corresponds to all parameters in the association configuration information, and is used to indicate whether all the parameters in the association configuration information are reserved.

In another implementation, the reassociation information includes a plurality of bits. One bit corresponds to one parameter in the association configuration information, and is used to indicate whether the corresponding parameter is reserved.

In still another implementation, the reassociation information includes a plurality of bits. One bit corresponds to one or more parameters in the association configuration information, and is used to indicate whether the corresponding one or more parameters are reserved.

In still another implementation, the reassociation information includes a plurality of bits. One bit corresponds to a plurality of parameters in the association configuration information, and is used to indicate whether the corresponding plurality of parameters are reserved.

Optionally, the reassociation information is carried in multi-link device information in a multi-link element in the reassociation response frame. Alternatively, the reassociation information is carried in the reassociation response frame in a form of an independent field.

In addition, in the multi-link establishment methods described in the first aspect and the second aspect, a manner of indicating the correspondence between a radio and a link and the correspondence between a radio and an AP is used to notify the STA MLD of a successfully established link and a link fails to be established. In the multi-link establishment methods described in the third aspect and the fourth aspect, the link establishment status of each link is indicated, to notify the STA MLD of a successfully established link and a link fails to be established. It can be learned that, the multi-link establishment methods described in the first aspect and the second aspect and the multi-link establishment methods described in the third aspect and the fourth aspect need to resolve a same problem, have specific technical features with a same function, and achieve a beneficial effect of more flexible multi-link establishment. Therefore, the multi-link establishment methods described in the first aspect and the second aspect and the multi-link establishment methods described in the third aspect and the fourth aspect belong to a same inventive concept, and satisfy a unity requirement.

According to a fifth aspect, this application further provides a multi-link establishment method. The method includes: A STA MLD sends a reassociation request frame; and the STA MLD receives a reassociation response frame, where the reassociation response frame carries reassociation information, and the reassociation information is used to indicate whether each parameter in association configuration information is reserved. The reassociation information is used to reserve a part of parameters, so that repeated transmission of the parameters in and after a reassociation operation can be avoided in this method, thereby reducing signaling overheads.

According to a sixth aspect, this application further provides a multi-link establishment method. The method corresponds to the method described in the fifth aspect, and is described from a perspective of an AP MLD. The method includes: The AP MLD receives a reassociation request frame; and the AP MLD sends a reassociation response frame, where the reassociation response frame carries reassociation information, and the reassociation information is used to indicate whether each parameter in association configuration information is reserved. The reassociation information is used to reserve a part of parameters, so that repeated transmission of the parameters in and after a reassociation operation can be avoided in this method, thereby reducing signaling overheads.

The following describes optional implementations for the multi-link establishment methods described in the fifth aspect and the sixth aspect.

In an implementation, the association configuration information may be information, shared on a plurality of links, in a multi-link device. The reassociation information is used to reserve a part of parameters, so that repeated transmission of the parameters in and after a reassociation operation can be avoided, thereby reducing signaling overheads.

In another implementation, the association configuration information includes but is not limited to one or more of the following parameters: a block acknowledgment protocol, a sequence number, a packet number, a duplicate detection cache, a fragmentation and reassembly buffer, and a buffered media access control service data unit MSDU.

The reassociation information includes one or more bits. One bit corresponds to one or more parameters in the association configuration information, and is used to indicate whether the corresponding one or more parameters are reserved. In other words, the reassociation information includes but is not limited to the following optional implementations.

In an implementation, the reassociation information includes one bit. The bit corresponds to all parameters in the association configuration information, and is used to indicate whether all the parameters in the association configuration information are reserved.

In another implementation, the reassociation information includes a plurality of bits.

One bit corresponds to one parameter in the association configuration information, and is used to indicate whether the corresponding parameter is reserved.

In still another implementation, the reassociation information includes a plurality of bits. One bit corresponds to one or more parameters in the association configuration information, and is used to indicate whether the corresponding one or more parameters are reserved.

In still another implementation, the reassociation information includes a plurality of bits. One bit corresponds to a plurality of parameters in the association configuration information, and is used to indicate whether the corresponding plurality of parameters are reserved.

Optionally, the reassociation information is carried in multi-link device information in a multi-link element in the reassociation response frame. Alternatively, the reassociation information is carried in the reassociation response frame in a form of an independent field.

In an implementation, a multi-link association response frame in the $1^{st}$ association process between the AP MLD and the STA MLD or the foregoing described reassociation response frame further carries link establishment status information. The link establishment status information is used to indicate a link establishment status of each link that the STA MLD requests to establish. It can be learned that, in the multi-link establishment method, the AP MLD may indicate the link establishment status of each link. A link fails to be established is allowed to exist in the links that the STA MLD requests to establish, thereby improving multi-link establishment flexibility.

For an optional implementation of the link establishment status information, refer to the implementations described in the third aspect and the fourth aspect. Details are not described herein again.

In another implementation, a multi-link association response frame in the $1^{st}$ association process between the AP MLD and the STA MLD or the foregoing described reassociation response frame further carries radio bitmap information. The radio bitmap information is used to indicate a radio, allowed to be used to establish each link that the STA MLD requests to establish, of the STA MLD. It can be learned that this implementation helps enable the AP MLD to notify the STA MLD of the radio, allowed to be used to establish each link that the STA MLD requests to establish, of the STA MLD.

Optionally, if the radio bitmap information indicates that a radio, allowed to be used to establish one link that the STA MLD requests to establish, of the STA MLD does not exist or is zero, it implicitly indicates that the link fails to be established. If the radio bitmap information indicates that there is one radio, allowed to be used to establish one link that the STA MLD requests to establish, of the STA MLD, it implicitly indicates that the link is successfully established. If the radio bitmap information indicates that there are a plurality of radios, allowed to be used to establish one link that the STA MLD requests to establish, of the STA MLD, it implicitly indicates that the link is successfully established, and the plurality of radios may all switch to the link.

Optionally, if the radio bitmap information indicates that a same radio of the STA MLD is allowed to be used to establish a plurality of links that the STA MLD requests to establish, it implicitly indicates that the radio may be used to establish the plurality of links, and may perform link switching between the plurality of links. It can be learned that, in the multi-link establishment method, whether link establishment succeeds is indicated, and the plurality of links may further be established for the same radio, to help the radio perform fast switching between the plurality of links, thereby avoiding a problem of a relatively large delay caused due to switching performed after a link is subsequently re-established.

For a possible description of the radio bitmap information, refer to the content described in the first aspect and the second aspect. Details are not described herein again.

In another implementation, a multi-link association response frame in the $1^{st}$ association process between the AP MLD and the STA MLD or the foregoing described reassociation response frame further carries a plurality of pieces of radio bitmap information, and one piece of radio bitmap information corresponds to one link that the STA MLD requests to establish. In other words, the radio bitmap information is used to indicate a radio, allowed to be used to establish the corresponding link, of the STA MLD.

It can be learned that this implementation helps the AP MLD notify the STA MLD of the radio, allowed to be used to establish each link that the STA MLD requests to establish, of the STA MLD. Further, if radio bitmap information of one link indicates that a radio, allowed to be used, of the STA MLD does not exist or is zero, it implicitly indicates that the link fails to be established. If radio bitmap information of one link indicates that there is one radio, allowed to be used, of the STA MLD, it implicitly indicates that the link is successfully established. If radio bitmap information of one link indicates that there are a plurality of radios, allowed to be used, of the STA MLD, it implicitly indicates that the link is successfully established, and the plurality of radios may all switch to the link.

Optionally, if radio bitmap information of a plurality of links separately indicates a same radio, allowed to be used, of the STA MLD, it implicitly indicates that the radio may be used to establish the plurality of links, and may perform link switching between the plurality of links.

It can be learned that, in this implementation, whether link establishment succeeds is indicated, and the plurality of links may further be established for the same radio, to help the radio perform fast switching between the plurality of links, thereby avoiding a problem of a relatively large delay caused due to switching performed after a link is subsequently re-established.

Optionally, for related content of this implementation, refer to the content described in the first aspect and the second aspect. Details are not described herein again.

According to a seventh aspect, this application provides a communication apparatus. The apparatus may be a STA MLD, or may be an apparatus in the STA MLD. The communication apparatus may alternatively be a processor or a chip system in the STA MLD. The communication apparatus may perform the method according to the first aspect. A function of the communication apparatus may be implemented by hardware, or may be implemented by hardware by executing corresponding software. The hardware or software includes one or more units corresponding to the foregoing function. The unit may be software and/or hardware. For an operation performed by the communication apparatus and a beneficial effect, refer to the method and the possible implementations in the first aspect, and the corresponding beneficial effect is achieved. Details are not described herein again. Alternatively, for an operation performed by the communication apparatus and a beneficial effect, refer to the method and the possible implementations in the third aspect, and the corresponding beneficial effect is achieved. Details are not described herein again. For an operation performed by the communication apparatus and a beneficial effect, refer to the method and the possible implementations in the fifth aspect, and the corresponding beneficial effect is achieved. Details are not described herein again.

According to an eighth aspect, this application provides a communication apparatus. The apparatus may be an AP MLD, or may be an apparatus in the AP MLD. The communication apparatus may alternatively be a processor or a chip system in the AP MLD. The communication apparatus may perform the method according to the second aspect. A function of the communication apparatus may be implemented by hardware, or may be implemented by hardware by executing corresponding software. The hardware or software includes one or more units corresponding to the foregoing function. The unit may be software and/or hardware. For an operation performed by the communication apparatus and a beneficial effect, refer to the method and the possible implementations in the second aspect, and the corresponding beneficial effect is achieved. Repeated parts are not described again. Alternatively, for an operation performed by the communication apparatus and a beneficial effect, refer to the method and the possible implementations in the fourth aspect, and the corresponding beneficial effect is achieved. Repeated parts are not described again. Alternatively, for an operation performed by the communication apparatus and a beneficial effect, refer to the method and the possible implementations in the sixth aspect, and the corresponding beneficial effect is achieved. Repeated parts are not described again.

According to a ninth aspect, this application provides a communication apparatus, where the communication apparatus may be a STA MLD or a chip system. The communication apparatus includes at least one processor, and when the processor invokes a computer program in a memory, the method performed by the STA MLD in any one of the first aspect or the possible implementations of the first aspect is performed, or the method performed by the STA MLD in any one of the third aspect or the possible implementations of the third aspect is performed, or the method performed by the STA MLD in any one of the fifth aspect or the possible implementations of the fifth aspect is performed.

According to a tenth aspect, this application provides a communication apparatus, where the communication apparatus may be an AP MLD or a chip system. The communication apparatus includes at least one processor, and when the processor invokes a computer program in a memory, the method performed by the AP MLD in any one of the second aspect or the possible implementations of the second aspect is performed, or the method performed by the AP MLD in any one of the fourth aspect or the possible implementations of the fourth aspect is performed, or the method performed by the AP MLD in any one of the sixth aspect or the possible implementations of the sixth aspect is performed.

According to an eleventh aspect, this application provides a communication apparatus, where the communication apparatus may be a STA MLD or a chip system. The communication apparatus includes a processor and a memory. The memory is configured to store a computer program; and the processor is configured to execute the computer program stored in the memory, to enable the communication apparatus to perform the method performed by the STA MLD in any one of the first aspect or the possible implementations of the first aspect, or the method performed by the STA MLD in any one of the third aspect or the possible implementations of the third aspect, or the method performed by the STA MLD in any one of the fifth aspect or the possible implementations of the fifth aspect.

According to a twelfth aspect, this application provides a communication apparatus, where the communication apparatus may be an AP MLD or a chip system. The communication apparatus includes a processor and a memory. The memory is configured to store a computer program; and the processor is configured to execute the computer program stored in the memory, to enable the communication apparatus to perform the method performed by the AP MLD in any one of the second aspect or the possible implementations of the second aspect, or the method performed by the AP MLD in any one of the fourth aspect or the possible implementations of the fourth aspect, or the method performed by the AP MLD in any one of the sixth aspect or the possible implementations of the sixth aspect.

According to a thirteenth aspect, this application provides a communication apparatus, where the communication apparatus may be a STA MLD. The communication apparatus includes a processor, a memory, and a transceiver. The transceiver is configured to receive a signal or send a signal; the memory is configured to store a computer program; and the processor is configured to invoke the computer program from the memory, to perform the method performed by the STA MLD in any one of the first aspect or the possible implementations of the first aspect, or the method performed by the STA MLD in any one of the third aspect or the possible implementations of the third aspect, or the method performed by the STA MLD in any one of the fifth aspect or the possible implementations of the fifth aspect.

According to a fourteenth aspect, this application provides a communication apparatus, where the communication apparatus may be an AP MLD. The communication apparatus includes a processor, a memory, and a transceiver. The transceiver is configured to receive a signal or send a signal; the memory is configured to store a computer program; and the processor is configured to invoke the computer program from the memory, to perform the method performed by the AP MLD in any one of the second aspect or the possible implementations of the second aspect, or the method performed by the AP MLD in any one of the fourth aspect or the possible implementations of the fourth aspect, or the method performed by the AP MLD in any one of the sixth aspect or the possible implementations of the sixth aspect.

According to a fifteenth aspect, this application provides a communication apparatus, where the communication apparatus may be a STA MLD or a chip system. The communication apparatus includes at least one processor and a communication interface. The processor runs a computer program to perform the method performed by the STA MLD in any one of the first aspect or the possible implementations of the first aspect, or the method performed by the STA MLD in any one of the third aspect or the possible implementations of the third aspect, or the method performed by the STA MLD in any one of the fifth aspect or the possible implementations of the fifth aspect.

According to a sixteenth aspect, this application provides a communication apparatus, where the communication apparatus may be an AP MLD or a chip system. The communication apparatus includes at least one processor and a communication interface. The processor runs a computer program to perform the method performed by the AP MLD in any one of the second aspect or the possible implementations of the second aspect, or the method performed by the AP MLD in any one of the fourth aspect or the possible implementations of the fourth aspect, or the method performed by the AP MLD in any one of the sixth aspect or the possible implementations of the sixth aspect.

According to a seventeenth aspect, this application provides a computer-readable storage medium. The computer-readable storage medium is configured to store instructions, and when the instructions are executed, the method performed by the STA MLD in any one of the first aspect or the possible implementations of the first aspect is performed, or the method performed by the STA MLD in any one of the third aspect or the possible implementations of the third aspect is performed, or the method performed by the STA MLD in any one of the fifth aspect or the possible implementations of the fifth aspect is performed.

According to an eighteenth aspect, this application provides a computer-readable storage medium. The computer-readable storage medium is configured to store instructions, and when the instructions are executed, the method performed by the AP MLD in any one of the second aspect or the possible implementations of the second aspect is performed, or the method performed by the AP MLD in any one of the fourth aspect or the possible implementations of the fourth aspect is performed, or the method performed by the AP MLD in any one of the sixth aspect or the possible implementations of the sixth aspect is performed.

According to a nineteenth aspect, this application provides a computer program product including instructions. When the instructions are executed, the method performed by the STA MLD in any one of the first aspect or the possible implementations of the first aspect is performed, or the method performed by the STA MLD in any one of the third aspect or the possible implementations of the third aspect is performed, or the method performed by the STA MLD in any one of the fifth aspect or the possible implementations of the fifth aspect is performed.

According to a twentieth aspect, this application provides a computer program product including instructions. When the instructions are executed, the method performed by the AP MLD in any one of the second aspect or the possible implementations of the second aspect is performed, or the method performed by the AP MLD in any one of the fourth aspect or the possible implementations of the fourth aspect is performed, or the method performed by the AP MLD in any one of the sixth aspect or the possible implementations of the sixth aspect is performed.

DESCRIPTION OF EMBODIMENTS

The following clearly and completely describes the technical solutions in embodiments of this application with reference to the accompanying drawings in the embodiments of this application.

A wireless communication system applicable to the embodiments of this application may be a wireless local area network (WLAN) or a cellular network. A multi-link establishment method may be implemented by a communication device in the wireless communication system or a chip or a processor in the communication device. The communication device may be a wireless communication device that supports concurrent transmission performed on a plurality of links. For example, the communication device is referred to as a multi-link device or a multi-band device. Compared with a device that supports only single-link transmission, the multi-link device has higher transmission efficiency and a higher throughput.

The embodiments of this application are mainly described by using an example in which an IEEE 802.11 network, for example, a wireless local area network (which is referred to as Wi-Fi 7 for short) of an 802.11 series protocol such as 802.11be, is deployed. However, aspects of this application may be extended to other networks that use various standards or protocols, for example, Bluetooth, a high performance radio LAN (HIPERLAN) (a wireless standard that is similar to the IEEE 802.11 standard and that is mainly used in Europe) and a wide area network (WAN), a wireless local area network (WLAN), a personal area network (PAN), or another now known or later developed network. Therefore, the various aspects provided in this application are applicable to any appropriate wireless network regardless of coverage and a wireless access protocol used.

Figure 1:
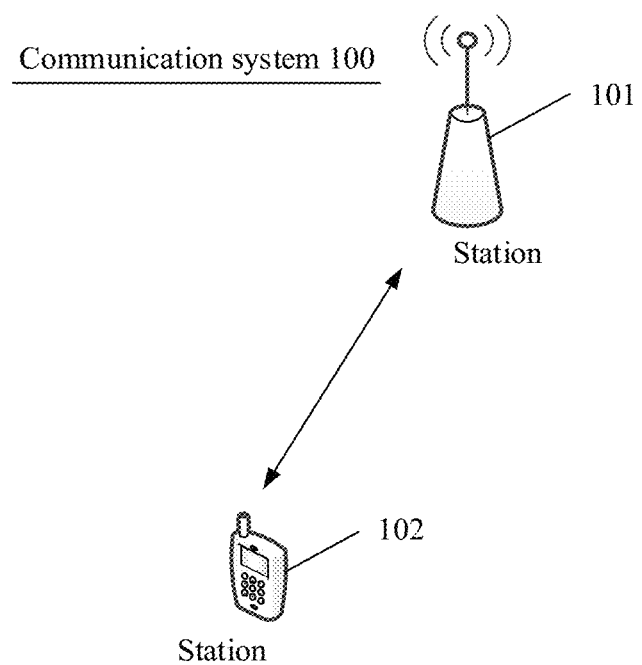
FIG. 1 is a schematic diagram of a structure of a communication system 100.

As shown in FIG. 1, using a wireless local area network as an example, a communication system 100 to which the embodiments of this application are applied includes a station 101 and a station 102. The station 101 may communicate with the station 102 by using a plurality of links, to improve a throughput. The station 101 may be a multi-link device, and the station 102 may be a single-link device, a multi-link device, or the like. In a scenario, the station 101 is an AP MLD, and the station 102 is a STA MLD or a station (for example, a single-link station). In another scenario, the station 101 is a STA MLD, and the station 102 is an AP (for example, a single-link AP) or an AP MLD. In still another scenario, the station 101 is an AP MLD, and the station 102 is an AP MLD or an AP. In still another scenario, the station 101 is a STA MLD, and the station 102 is a STA MLD or a STA (for example, a single-link station). Certainly, the wireless local area network may further include another device. A quantity and types of the devices shown in the communication system are merely an example.

Figure 2:
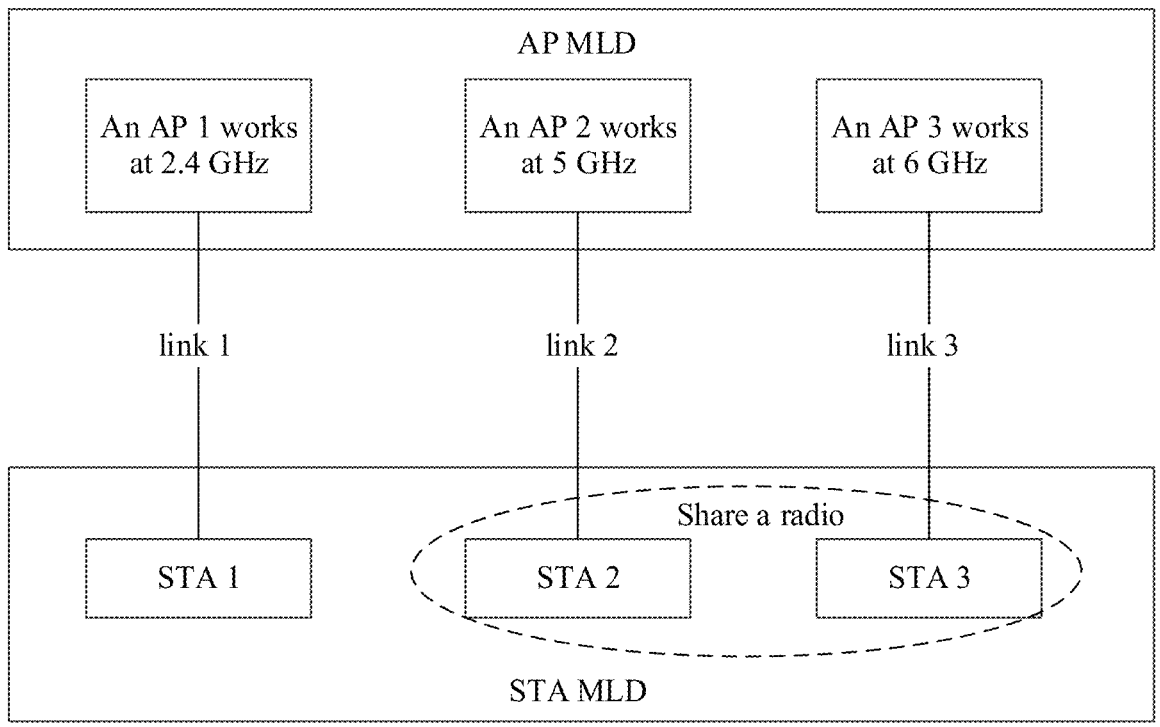
FIG. 2 is a schematic diagram of a structure of a communication system 200.

For another example, FIG. 2 shows a communication system 200. In the communication system 200, an example of a scenario in which an AP MLD communicates with a STA MLD in a wireless local area network is used. The AP MLD includes an AP 1, an AP 2 and an AP 3 that are affiliated, the STA MLD includes a STA 1, a STA 2, and a STA 3 that are affiliated, and the AP MLD communicates with the STA MLD by using a link 1, a link 2, and a link 3 in parallel.

To help understand the multi-link establishment method in this application, related concepts in the embodiments of this application are briefly described.

1. Multi-Link Device

The multi-link device includes one or more affiliated stations STAs (affiliated STAs). The affiliated STA is a logical station and can work on one link. The affiliated station may be an access point (AP) or a non-access point station (non-AP STA). For ease of description, in this application, a multi-link device whose affiliated station is an AP may be referred to as a multi-link AP, a multi-link AP device, or an AP multi-link device (AP MLD). A multi-link device whose affiliated station is a non-AP STA may be referred to as a multi-link STA, a multi-link STA device, or a STA multi-link device (STA MLD). For ease of description, that "the multi-link device includes an affiliated STA" is also briefly described as that "the multi-link device includes a STA" in the embodiments of this application.

The multi-link device may implement wireless communication according to 802.11 family standards. For example, a station complying with an extremely high throughput (EHT), or a station complying with 802.11be or compatible with a station supporting 802.11be implements communication with another device. Certainly, the another device may be a multi-link device, or may not be a multi-link device.

For example, the multi-link device in the embodiments of this application may be a single-antenna device, or may be a multi-antenna device, for example, a device with more than two antennas. A quantity of antennas included in the multi-link device is not limited in the embodiments of this application.

For example, the multi-link device is an apparatus having a wireless communication function. The apparatus may be an integrated device, or may be a chip, a processing system, or the like installed on the integrated device. The device on which the chip or the processing system is installed may be controlled by the chip or the processing system to implement methods and functions in the embodiments of this application. For example, the STA MLD in the embodiments of this application has a wireless transceiver function, may support the 802.11 series protocols, and may communicate with an AP MLD, another STA MLD, or a single-link device. For example, the STA MLD is any user communication device that allows a user to communicate with an AP and further communicate with a WLAN. For example, the STA MLD may be user equipment that can be connected to a network, such as a tablet computer, a desktop computer, a laptop computer, a notebook computer, an ultra-mobile personal computer (UMPC), a handheld computer, a netbook, a personal digital assistant (PDA), or a mobile phone, may be an Internet of Things node in an Internet of Things, or may be a vehicle-mounted communication apparatus in an Internet of Vehicles. The STA MLD may alternatively be a chip and a processing system in the foregoing terminals.

The AP MLD in the embodiments of this application is an apparatus that serves the STA MLD, and may support the 802.11 series protocols. For example, the AP MLD may be a communication entity such as a communication server, a router, a switch, or a bridge, or the AP MLD may include various forms of macro base stations, micro base stations, and relay stations. Certainly, the AP MLD may alternatively be a chip and a processing system in the various forms of devices, to implement the method and the function in the embodiments of this application. In addition, the multi-link device may support high-rate and low-latency transmission. With the continuous evolution of application scenarios of the wireless local area network, the multi-link device may be further applied to more scenarios. For example, the multi-link device may be a sensor node (such as a smart water meter, a smart electricity meter, a smart air detection node)

in a smart city, a smart device (such as a smart camera, a projector, a display, a TV, a stereo, a refrigerator, and a washing machine) in smart home, a node in the internet of things, an entertainment terminal (for example, a wearable device such as an AR and a VR), a smart device (such as a printer and a projector) in smart office, an IoV device in the internet of vehicles, and some infrastructures (such as a vending machine, a self-service navigation station in a supermarket, self-service cash register device, and a self-service ordering machine) in daily life scenarios. Specific forms of the STA MLD and the AP MLD are not specifically limited in the embodiments of this application, and are merely examples for description herein. The 802.11 protocol may be a protocol that supports 802.11be or is compatible with 802.11be.

A frequency band on which the multi-link device operates may include but is not limited to sub 1 GHZ, 2.4 GHZ, 5 GHZ, 6 GHZ, and high frequency 60 GHz.

2. Multi-Link Establishment Operation

As shown in FIG. 2, the STA MLD performs the multi-link establishment operation, to establish the plurality of links, for example, the link 1, the link 2, and the link 3, to the AP MLD. The multi-link establishment operation may also be referred to as a multi-link association operation. To be specific, the STA MLD may be associated with the plurality of links to the AP MLD by using the multi-link establishment operation. For example, as shown in FIG. 2, the STA 1 of the STA MLD is associated with the link 1, the STA 2 is associated with the link 2, and the STA 3 is associated with the link 3. The multi-link establishment operation may also be referred to as a multi-link device association operation. To be specific, the STA MLD may associate each STA in the STA MLD with the AP in the AP MLD by using the multi-link establishment operation. For example, as shown in FIG. 2, the STA 1 is associated with the AP 1, the STA 2 is associated with the AP 2, and the STA 3 is associated with the AP 3.

In the multi-link establishment operation, the STA MLD establishes the plurality of links to the AP MLD by exchanging a multi-link association request frame and a a multi-link association response frame on a link. The link is referred to as a sending link or a transmitted link, and another link is referred to as a non-sending link or a non-transmitted link.

Using the communication system shown in FIG. 2 as an example, the multi-link establishment operation may include the following steps.

The STA MLD sends the multi-link association request frame to the AP MLD on the link 1. The multi-link association request frame carries not only station-side information of the link 1, but also station-side information of the link 2 and the link 3. The station-side information includes a station identifier corresponding to the link, and the like. The link 1 is a transmitted link, and the link 2 and the link 3 are non-transmitted links.

The AP MLD returns the multi-link association response frame to the STA MLD. The multi-link association response frame carries not only the station-side information of the link 1, but also access point-side information of the link 1, the station-side information and access point-side information of the link 2, and the station-side information and access point-side information of the link 3. In this way, a multi-link connection is established between the STA MLD and the AP MLD.

The multi-link association request frame in this application is an association request frame that carries a multi-link element. Optionally, the multi-link association request frame may also be referred to as a multi-link establishment request frame, an association request frame, or an establishment request frame. The multi-link association response frame in this application is an association response frame that carries a multi-link element. Optionally, the multi-link association response frame may also be referred to as a multi-link establishment response frame, an association response frame, or an establishment response frame. The following describes the multi-link association response frame with reference to FIG. 3.

3. Multi-Link Association Response Frame

Figure 3:
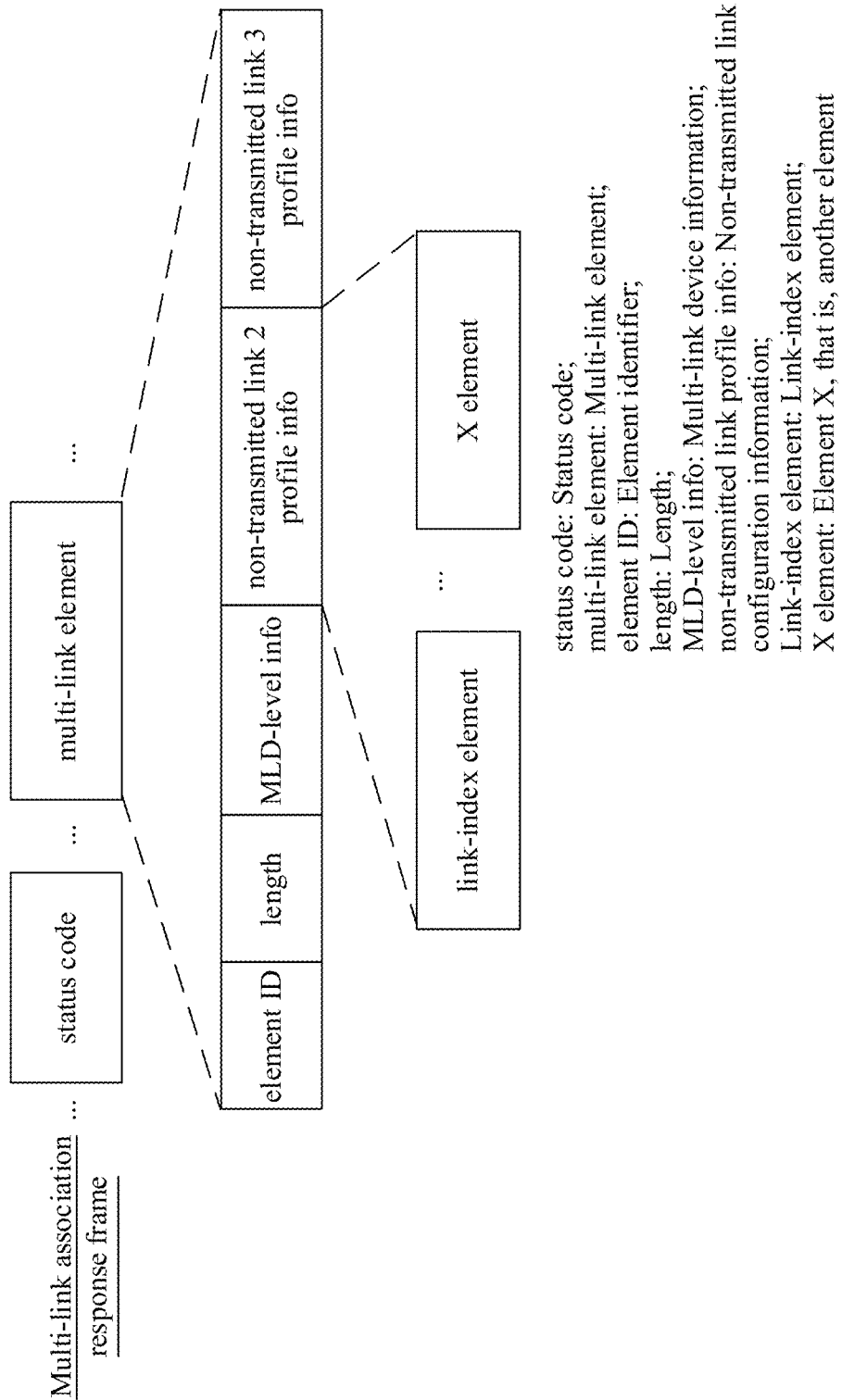
FIG. 3 is a schematic diagram of a structure of a multi-link association response frame.

Station-side information and access point-side information carried in the multi-link association response frame may be located in a multi-link element. Both the multi-link association request frame and the multi-link association response frame carry the multi-link element. As shown in FIG. 3, information carried in the multi-link element in the multi-link association response frame and carried in the multi-link association response frame is divided into two parts. One part is multi-link device information (MLD-level info), and the other part is link configuration information of each link (per link profile info). Link configuration information of each non-transmitted link may be referred to as non-transmitted link configuration information for short. Certainly, the multi-link element may further include another field or other information.

Content of the link configuration information in the multi-link association request frame is different from content of the link configuration information in the multi-link association response frame. For example, both the link configuration information in the multi-link association request frame and the link configuration information in the multi-link association response frame carry a link identifier of a link, radio-related information, and the like. However, the link configuration information in the multi-link association response frame may not carry related information of a station side. Specifically, this is not limited in the embodiments of this application.

The MLD-level info carries related information of the multi-link device, for example, a service access point media access control address (SAP MAC address) of the STA MLD and a service access point media access control address of the AP MLD. The per link profile info starts with a fixed element, namely, a link-index element. The link-index element carries a link identifier (link ID) of a corresponding link, to indicate the link of which the link profile info is related information. The link-index element further carries an element, which is denoted as an x element in FIG. 3, of a STA side (or an AP side) of the link. The x element is an element having content different from that of an element of a STA side (or an AP side) of the transmitted link. The STA MLD may obtain information such as a link ID of each link of the AP MLD by receiving a probe response frame or a beacon frame.

In addition, aside from carrying the multi-link element, the multi-link association response frame may further carry other fields. As shown in Table 1, based on sequence numbers, the other fields are: a capability information field, a status code field, an association identifier (AID) field, a supported rate and a basic service set (BSS) field, and the like. An association response frame is sent by an access point in an association process between single-link devices, and the multi-link association response frame is sent by an access point multi-link device in an association process between multi-link devices.

TABLE 1

Association response frame

| Sequence number | Information | Comment |
|---|---|---|
| 1 | Capability information | |
| 2 | Status code | |
| 3 | Association identifier (AID) | |
| 4 | Supported rate and BSS member selector | If dot11DMGOptionImplemented is true, this element is not present |
| . . . | . . . | . . . |

The status code field is used to indicate whether the multi-link establishment operation succeeds, whether the multi-link device association operation succeeds, or whether each STA in the STA MLD is associated with each AP in the AP MLD. Table 2 shows status code.

TABLE 2

Status code field

| Status code | Name | Meaning |
|---|---|---|
| 0 | Succeed | Succeed |
| 1 | Rejected, and rejected for an unspecified reason | Failure for an unspecified reason |
| 2 | Tunneled direct link setup (tunneled direct link setup, TDLS) is rejected, and an alternative option is provided | Direct link scheduling is rejected, but alternative scheduling is provided |
| . . . | . . . | . . . |

4. Radio of a Multi-Link Device

A multi-link device may be a single-antenna (or single-radio module or single-radio) multi-link device, or may be a multi-antenna (or multi-radio module or multi-radio) multi-link device. A quantity of antennas included in the multi-link device is not limited in the embodiments of this application. In other words, the multi-link device may include one or more radios, where each radio may support one or more foregoing described frequency bands. It should be noted that the radio in this solution includes not only a radio module, but also a baseband processing module. Optionally, in this application, a radio of a STA MLD may also be referred to as a station of the STA MLD.

When one radio of the STA MLD may support a plurality of frequency bands, the radio may switch between links, separately corresponding to the plurality of frequency bands, of an AP MLD. For example, as shown in FIG. 2, one radio of the STA MLD may support two frequency bands, namely, 5 GHz and 6 GHz. Therefore, the radio may switch between the link 2 and the link 3. In other words, the STA 2 corresponding to the link 2 and the STA 3 corresponding to the link 3 may share one radio. That is, the radio may be used to virtualize the two STAs. In other words, the link 2 and the link 3 may share one radio, or the STA 2 and the STA 3 may share one radio.

Although the STA MLD may establish the two links by using the radio, because the two links share one radio of the STA MLD, only one of the two links can be in an enable state, and the other link is in a disable state at a same time. Optionally, because the STA MLD has established the link 2 and the link 3 by using the radio, the STA MLD may quickly switch from the link 2 to the link 3, so that the link 2 changes from the enable state to the disable state, and the link 3 changes from the disable state to the enable state.

It should be noted that all links discussed in this application are links requested, by using the multi-link association request frame, to be established. All radios of the STA MLD discussed in this application are radios whose radio-related information is carried in the multi-link association request frame. A quantity of APs of the AP MLD discussed in this application may be a quantity of independent radios of the AP MLD. In addition, all the APs of the AP MLD discussed in this application are APs corresponding to link identifiers carried in the multi-link association request frame.

This application further provides a multi-link establishment method 100 and a multi-link establishment method 200. In both the multi-link establishment method 100 and the multi-link establishment method 200, radio bitmap information may be used to learn of a radio allowed to be used to establish each link. Further, this helps determine, when there is no radio allowed to be used for the link, that the link fails to be established; or determine, when there is the radio allowed to be used for the link, that the link is successfully established. When a same radio is allowed to be used to establish a plurality of links, the radio can perform fast link switching between the plurality of links, thereby avoiding a problem of a relatively long delay caused by reestablishing the link, and improving multi-link establishment flexibility.

This application further provides a multi-link establishment method 300. The multi-link establishment method 300 may indicate whether each link that a STA MLD requests to establish is successfully established. Different from the manner in which only one status code field in the association response frame is used to indicate whether STA association is successful, the multi-link establishment method 300 is applicable to a multi-link device. Link establishment status information may be used to indicate whether each link that the STA MLD requests to establish is successfully established, that is, a link that fails to be established is allowed to exist, thereby improving multi-link establishment flexibility.

This application provides a multi-link establishment method 400. In the multi-link establishment method 400, in a reassociation process, a predefined rule is used to enable a STA MLD to reserve a part of parameters in previously associated configuration information, thereby reducing signaling overheads.

This application further provides a multi-link establishment method 500. In the multi-link establishment method 500, in a reassociation process, a STA MLD is explicitly indicated, by using reassociation information, to reserve a part of parameters in previously associated configuration information, thereby reducing signaling overheads. It can be learned that, compared with a current manner in which when a single-link device needs to modify capability information or some attributes of the single-link device, the single-link device deletes previously associated configuration information and obtains configuration information again in a reassociation operation process, the multi-link establishment method 400 and the multi-link establishment method 500 help reduce signaling overheads.

In addition, the multi-link establishment method 100 to the multi-link establishment method 300 need to resolve a same problem, have specific technical features with a same function, and achieve similar beneficial effects. Therefore, the multi-link establishment method 100 to the multi-link establishment method 300 belong to a same inventive concept, and satisfy a unity requirement.

The multi-link association response frame may carry one or more of the reassociation information, the link establishment status information, and the radio bitmap information. This is not limited in the embodiments of this application.

The following separately describes this application with reference to the accompanying drawings.

Embodiment 1

This application further provides the multi-link establishment method 100. In the multi-link establishment method 100, a radio, allowed to be used to establish each link in a plurality of links that a STA MLD requests to establish, of the STA MLD may be indicated.

For example, it is assumed that the STA MLD has two radios, namely, a radio 1 and a radio 2, an AP MLD has an AP 1, an AP 2, and an AP 3, and links of the AP MLD are separately a link 1, a link 2, and a link 3. In the multi-link establishment method 100, for the link 1, the link 2, and the link 3 that the STA MLD requests to establish, a radio that is allowed to be used to establish the link 1 and that is of the STA MLD, a radio that is allowed to be used to establish the link 2 and that is of the STA MLD, and a radio that is allowed to be used to establish the link 3 and that is of the STA MLD may be indicated.

Alternatively, it may be described as one or more of the following: In the multi-link establishment method 100, an AP that each radio of the STA MLD is allowed to be associated with and that is in the AP MLD may be indicated; or a link that is allowed to share each radio of the STA MLD in the plurality of links that the STA MLD requests to establish may be indicated; or a link that each radio of the STA MLD is allowed to be used to establish may be indicated; or a radio that each AP in the AP MLD is allowed to be associated with and that is of the STA MLD may be indicated.

For example, it is assumed that the STA MLD has two radios, namely, a radio 1 and a radio 2, an AP MLD has an AP 1, an AP 2, and an AP 3, and links of the AP MLD are separately a link 1, a link 2, and a link 3. In the multi-link establishment method 100, APs that the radio 1 and the radio 2 are separately allowed to be associated with and that are in the AP MLD may be indicated; or a link that is allowed to share the radio 1 and a link that is allowed to share the radio 2 in the link 1, the link 2, and the link 3 may be indicated; or a link that the radio 1 is allowed to be used to establish and a link that the radio 2 is allowed to be used to establish may be indicated; or a radio that the AP 1 is allowed to be associated with, a radio that the AP 2 is allowed to be associated with, and a radio that the AP 3 is allowed to be associated with may be indicated.

Figure 4:
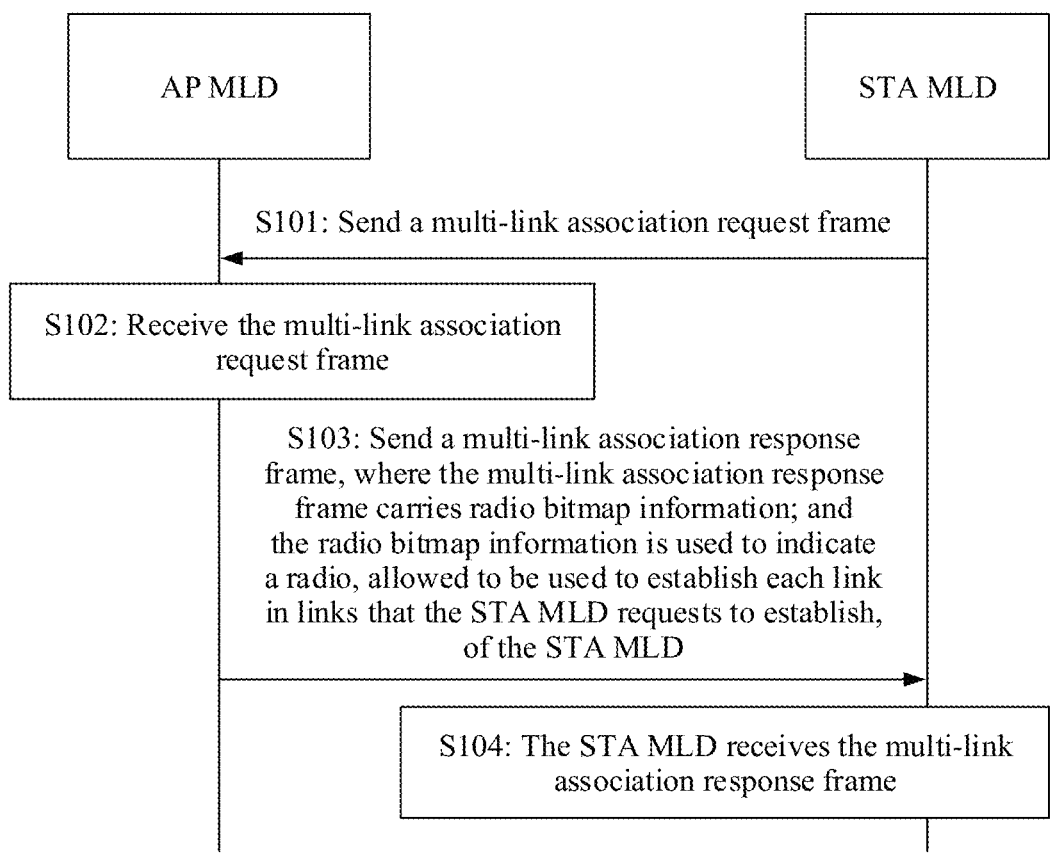
FIG. 4 is a schematic flowchart of a multi-link establishment method 100 according to an embodiment of this application.

FIG. 4 is a schematic flowchart of the multi-link establishment method 100 according to an embodiment of this application. The multi-link establishment method 100 includes but is not limited to the following steps.

S101: The STA MLD sends a multi-link association request frame.

S102: The AP MLD receives the multi-link association request frame.

S103: The AP MLD sends a multi-link association response frame, where the multi-link association response frame includes radio bitmap information, and the radio bitmap information is used to indicate a radio, allowed to be used to establish each link in links that the STA MLD requests to establish, of the STA MLD.

S104: The STA MLD receives the multi-link association response frame.

Further, the multi-link establishment method 100 may further include: The STA MLD determines, based on the radio bitmap information, a plurality of links that are allowed to use a same radio, to perform link switching between the plurality of links by using the radio; the STA MLD determines, based on the radio bitmap information, a link that has no radio allowed to be used, to determine that the link fails to be established; and the STA MLD determines, based on the radio bitmap information, a link that has a radio allowed to be used to establish the link, to determine that the link is successfully established.

It can be learned that, in this embodiment of this application, the AP MLD is enabled to not only notify the STA MLD of the radio, allowed to be used to establish each link that the STA MLD requests to establish, of the STA MLD. In this way, the STA MLD determine, based on the radio bitmap information, whether a link is successfully established. In other words, the AP MLD is allowed to reject establishing a part of the links requested by the STA MLD, thereby improving multi-link establishment flexibility. In addition, the STA MLD determines, based on the radio bitmap information, the plurality of links that may be established by using the same radio, to help the radio flexibly switch between the plurality of links. In other words, a quantity of radios of the STA MLD is allowed to be less than a quantity of links that the STA MLD requests to establish, thereby further improving the multi-link establishment flexibility.

In an implementation, the multi-link association request frame carries radio quantity information, where the radio quantity information is used to indicate the quantity of radios of the STA MLD. A quantity of bits occupies by the radio quantity information is determined based on the quantity of radios of the STA MLD. For example, assuming that the quantity of radios of the STA MLD is two, the quantity of bits occupies by the radio quantity information is one. Assuming that the quantity of radios of the STA MLD is four, the quantity of bits occupies by the radio quantity information is two.

In another implementation, the quantity of radios of the STA MLD is determined based on radio-related information carried in the multi-link association request frame. For example, a quantity of radio media access control addresses carried in the multi-link association request frame is the quantity of radios of the STA MLD.

A total quantity of bits occupied by the radio bitmap information=a product of the quantity of radios of the STA MLD and a quantity of APs of the AP MLD. Alternatively, a total quantity of bits occupied by the radio bitmap information=a product of the quantity of radios of the STA MLD and a quantity of links that the STA MLD requests to establish. It can be learned that the radio quantity information carried in the multi-link association request frame helps determine the quantity of bits of the radio bitmap information or a length of the radio bitmap information.

Specifically, the radio bitmap information is used to indicate the radio, allowed to be used to establish each link in the plurality of links that the STA MLD requests to establish, of the STA MLD. One link corresponds to R bits in the radio bitmap information, where R is the quantity of radios of the STA MLD. One of the R bits corresponds to one radio of the STA MLD, and the bit indicates whether the corresponding radio is allowed to be used to establish the link. In addition, the R bits, corresponding to each link, in the radio bitmap information may be determined based on a link identifier or predefined. The bit, corresponding to each radio, in the R bits may be determined based on a sequence of the related information of the radios carried in the multi-link association request frame, or predefined. For example, the quantity R of radios of the STA MLD is equal to two, and a sequence in which the radio-related information carried in the multi-link association request frame sent by the STA MLD appears is that related information of the radio 2 appears first, and related information of the radio 1 appears next. In this case, the $1^{st}$ bit in the two bits corresponds to the radio 2, and the $2^{nd}$ bit corresponds to the radio 1.

For example, it is assumed that the STA MLD has two radios, namely, a radio 1 and a radio 2, and links that the STA MLD requests to establish are a link 1, a link 2, and a link 3. In this case, the radio bitmap information comprises six bits, and R is equal to two. Two bits corresponding to the link 1, two bits corresponding to the link 2, and two bits corresponding to the link 3 in the six bits may be: the link 1 corresponds to the first two bits, the link 2 corresponds to the middle two bits, and the link 3 corresponds to the last two bits. Bits, separately corresponding to the two radios, in every two bits may be: the $1^{st}$ bit corresponds to the radio 1, and the $2^{nd}$ bit corresponds to the radio 2. If the radio bitmap information is 100101, it indicates that a radio allowed to be used to establish the link 1 is the radio 1, and a radio allowed to be used to establish the link 2 and a radio allowed to be used to establish the link 3 are both the radio 2. It can be learned that the link 1, the link 2, and the link 3 are all successfully established, and the radio 2 may be used to establish the link 2 and the link 3. Therefore, the radio 2 may switch between the link 2 and the link 3.

In addition, the radio bitmap information may be carried not only in the multi-link association response frame, but also in the multi-link association request frame. The multi-link association request frame carrying the radio bitmap information may notify the AP MLD of the foregoing correspondences requested by the STA MLD. An example in which the radio bitmap information is in the multi-link association response frame is used for description below.

Figure 5:
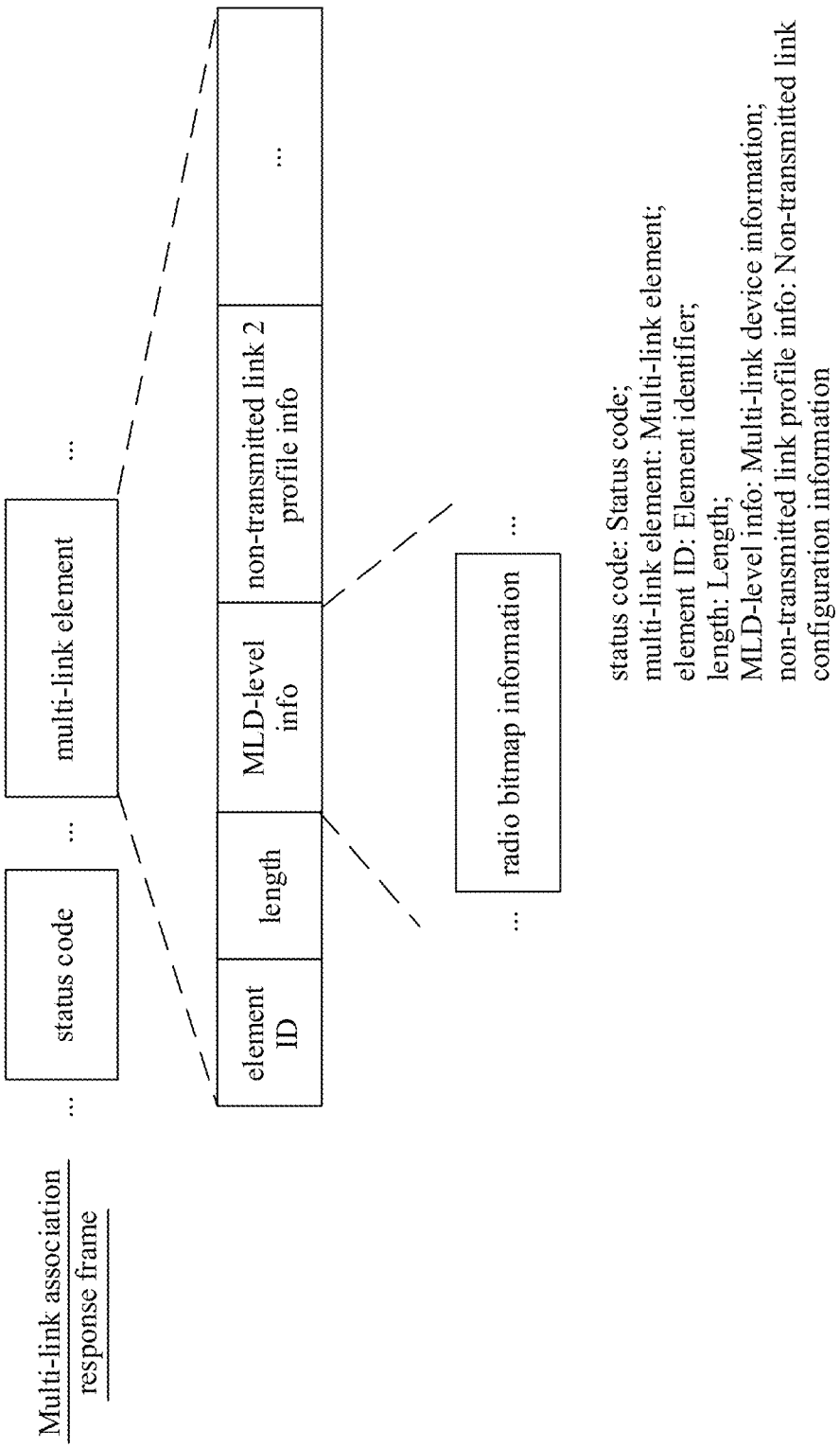
FIG. 5 is another schematic diagram of a structure of a multi-link association response frame according to an embodiment of this application.

The radio bitmap information may be carried in MLD-level info in a multi-link element, to indicate a correspondence between each radio of the STA MLD and each AP in the AP MLD, or a correspondence between each radio of the STA MLD and each link that the STA MLD requests to establish. The radio bitmap information may be referred to as a radio's bitmap indication for each link (Radio's Bitmap indication for each link) field. As shown in FIG. 5, the radio's bitmap indication for each link field is located in the MLD-level info in the multi-link element.

Optionally, the radio bitmap information is described from different perspectives, and the radio bitmap information corresponds to different descriptions. For example, the radio bitmap information is used to indicate a radio that each AP in the AP MLD is allowed to be associated with and that is of the STA MLD. Alternatively, the radio bitmap information is used to indicate an AP that each radio of the STA MLD is allowed to be associated with and that is of the AP MLD. Alternatively, the radio bitmap information is used to indicate a link that is allowed to share each radio of the STA MLD in a plurality of links that the STA MLD requests to establish. Alternatively, the radio bitmap information is used to indicate a link that each radio of the STA MLD is allowed to be used to establish. In other words, the radio bitmap information may indicate the correspondence between each radio of the STA MLD and each AP in the AP MLD, or the correspondence between each radio of the STA MLD and each link that the STA MLD requests to establish.

How another description manner of the radio bitmap information specifically indicates the correspondences when the radio bitmap information is located in the MLD-level info in the multi-link element is described below.

In a description, the radio bitmap information is used to indicate a radio of the STA MLD, where the radio is allowed to be used to establish each link of the AP MLD with an AP of the link. One link corresponds to R bits in the radio bitmap information, where R is the quantity of radios of the STA MLD. One bit in the R bits corresponds to one radio of the STA MLD, and indicates whether the corresponding radio is allowed to be used to establish the link with the AP. In addition, the R bits, corresponding to each link, in the radio bitmap information may be determined based on a link identifier or predefined. The bits, separately corresponding to the R radios, in the R bits may be determined based on a sequence of the related information of the radios carried in the multi-link association request frame, or predefined.

For example, it is assumed that the STA MLD has two radios, namely, a radio 1 and a radio 2, and links that the STA MLD requests to establish are a link 1, a link 2, and a link 3. In this case, the radio bitmap information is six bits, and R is equal to two. The radio bitmap information indicates a radio that may be used to establish the link 1 with an AP 1, a radio that may be used to establish the link 2 with an AP 2, and a radio that may be used to establish the link 3 with an AP 3 in the radio 1 and the radio 2. Two bits corresponding to the link 1, two bits corresponding to the link 2, and two bits corresponding to the link 3 in the six bits may be: the link 1 corresponds to the first two bits, the link 2 corresponds to the middle two bits, and the link 3 corresponds to the last two bits. Bits, separately corresponding to the two radios, in every two bits may be: the $1^{st}$ bit corresponds to the radio 1, and the $2^{nd}$ bit corresponds to the radio 2. If the radio bitmap information is 100101, it indicates that the radio 1 is allowed to be used to establish the link 1 with the AP 1, and the radio 2 is not allowed to be used to establish the link 1 with the AP 1; the radio 1 is not allowed to be used to establish the link 2 with the AP 2, and the radio 2 is allowed to be used to establish the link 2 with the AP 2; and the radio 1 is not allowed to be used to establish the link 3 with the AP 3, and the radio 2 is allowed to be used to establish the link 3 with the AP 3. It can be learned that the link 1, the link 2, and the link 3 are all successfully established. In addition, the radio 2 may establish the link 2 with the AP 2, and establish the link 3 with the AP 3. Therefore, the radio 2 may switch between the link 2 and the link 3 respectively.

In another description, the radio bitmap information is used to indicate the radio that each AP in the AP MLD is allowed to be associated with and that is of the STA MLD. One AP corresponds to R bits in the radio bitmap information, where R is the quantity of radios of the STA MLD. One bit in the R bits corresponds to one radio of the STA MLD, and indicates whether the corresponding radio is allowed to be associated with the AP. In addition, the R bits, corresponding to each AP, in the radio bitmap information may be determined based on an association identifier of the AP or predefined. The bits, separately corresponding to the R radios, in the R bits may be determined based on a sequence of the related information of the radios carried in the multi-link association request frame, or predefined.

For example, it is assumed that the STA MLD has two radios, namely, a radio 1 and a radio 2, and the AP MLD has three APs, namely, an AP 1, an AP 2, and an AP 3. In this case, the radio bitmap information is six bits, and R is equal to two. Two bits corresponding to the AP 1, two bits corresponding to the AP 2, and two bits corresponding to the AP 3 in the six bits may be: the AP 1 corresponds to the first two bits, the AP 2 corresponds to the middle two bits, and the AP 3 corresponds to the last two bits. Bits, separately corresponding to the two radios, in every two bits may be: the $1^{st}$ bit corresponds to the radio 1, and the $2^{nd}$ bit corresponds to the radio 2. If the radio bitmap information is 100101, it indicates that a radio that the AP 1 is allowed to be associated with is the radio 1, and a radio that the AP 2 is allowed to be associated with and a radio that the AP 3 is allowed to be associated with are both the radio 2. It can be learned that the radio 2 switches between the AP 2 and the AP 3.

In still another description, the radio bitmap information is used to indicate the AP that each radio of the STA MLD is allowed to be associated with and that is of the AP MLD. One radio corresponds to S bits in the radio bitmap information, where S is the quantity of APs of the AP MLD. One bit in the S bits corresponds to one AP of the AP MLD, and indicates whether the radio is allowed to be associated with the AP. In addition, the S bits, corresponding to each radio, in the radio bitmap information may be determined based on a sequence of the related information of the radios carried in the multi-link association request frame, or predefined. The bits, separately corresponding to the S APs, in the S bits may be determined based on association identifiers of the APs or predefined.

For example, it is assumed that the STA MLD has two radios, namely, a radio 1 and a radio 2, and the AP MLD has three APs, namely, an AP 1, an AP 2, and an AP 3. In this case, the radio bitmap information is six bits, and S is equal to two. Three bits corresponding to the radio 1 and three bits corresponding to the radio 2 in the six bits may be: the radio 1 corresponds to the first three bits, and the radio 2 corresponds to the last three bits. Bits, separately corresponding to the three APs, in every three bits may be: the $1^{st}$ bit corresponds to the AP 1, the $2^{nd}$ bit corresponds to the AP 2, and the $3^{rd}$ bit corresponds to the AP 3. If the radio bitmap information is 010101, it indicates that the radio 1 is allowed to be associated with the AP 2, and the radio 2 is allowed to be associated with the AP 1 and the AP 3. It can be learned that the radio 2 switches between the AP 1 and the AP 3.

In still another description, the radio bitmap information is used to indicate the link that is allowed to share each radio of the STA MLD in the plurality of links that the STA MLD requests to establish. One radio corresponds to S bits in the radio bitmap information, where S is the quantity of links of the AP MLD. One bit in the S bits corresponds to one link of the STA MLD, and indicates whether the corresponding link is allowed to share the radio. In addition, the S bits, corresponding to each radio, in the radio bitmap information may be determined based on a sequence of the related information of the radios carried in the multi-link association request frame, or predefined. The bits, separately corresponding to the S links, in the S bits may be determined based on a link identifier or predefined.

For example, it is assumed that the STA MLD has two radios, namely, a radio 1 and a radio 2, and links that the STA MLD requests to establish are a link 1, a link 2, and a link 3. In this case, the radio bitmap information is six bits, and S is equal to three. Three bits corresponding to the radio 1 and three bits corresponding to the radio 2 in the six bits may be: the radio 1 corresponds to the first three bits, and the radio 2 corresponds to the last three bits. Bits, separately corresponding to the link 1, the link 2, and the link 3, in every three bits may be: the $1^{st}$ bit corresponds to the link 1, the $2^{nd}$ bit corresponds to the link 2, and the $3^{rd}$ bit corresponds to the link 3. If the radio bitmap information is 010101, it indicates that a link that is allowed to share the radio 1 is the link 2, and a link that is allowed to share the radio 2 is the link 1 and the link 3. It can be learned that the radio 2 switches between the link 1 and the link 3.

In still another description, the radio bitmap information is used to indicate the link that each radio of the STA MLD is allowed to be used to establish. One radio corresponds to S bits in the radio bitmap information, where S is the quantity of links of the AP MLD. One bit in the S bits corresponds to one link of the STA MLD, and indicates whether the radio is allowed to be used to establish the corresponding link. In addition, the S bits, corresponding to each radio, in the radio bitmap information may be determined based on a sequence of the related information of the radios carried in the multi-link association request frame, or predefined. The bits, separately corresponding to the S links, in the S bits may be determined based on a link identifier or predefined.

For example, it is assumed that the STA MLD has two radios, namely, a radio 1 and a radio 2, and links that the STA MLD requests to establish are a link 1, a link 2, and a link 3. In this case, the radio bitmap information is six bits, and S is equal to three. Three bits corresponding to the radio 1 and three bits corresponding to the radio 2 in the six bits may be: the radio 1 corresponds to the first three bits, and the radio 2 corresponds to the last three bits. Bits, separately corresponding to the link 1, the link 2, and the link 3, in every three bits may be: the $1^{st}$ bit corresponds to the link 1, the $2^{nd}$ bit corresponds to the link 2, and the $3^{rd}$ bit corresponds to the link 3. If the radio bitmap information is 010101, it indicates that a link that the radio 1 is allowed to be used to establish is the link 2, and a link that the radio 2 is allowed to be used to establish is the link 1 and the link 3. It can be learned that the radio 2 switches between the link 1 and the link 3.

It can be learned that, in this embodiment of this application, when the radio bitmap information is interpreted from different perspectives, each bit in the radio bitmap information corresponds to different meanings. Specifically, one of the interpretations, namely, one of the descriptions, is determined in a manner of predefining or signaling configuration. This is not specifically limited in this embodiment of this application. In conclusion, regardless of how the radio bitmap information is described, the STA MLD may learn of information such as the radio that is allowed by the AP MLD to be used on a STA side of a link, whether a link is successfully established, and the links between which the radio may quickly switch. As a result, multi-link establishment flexibility is greatly improved.

Embodiment 2

Figure 6:
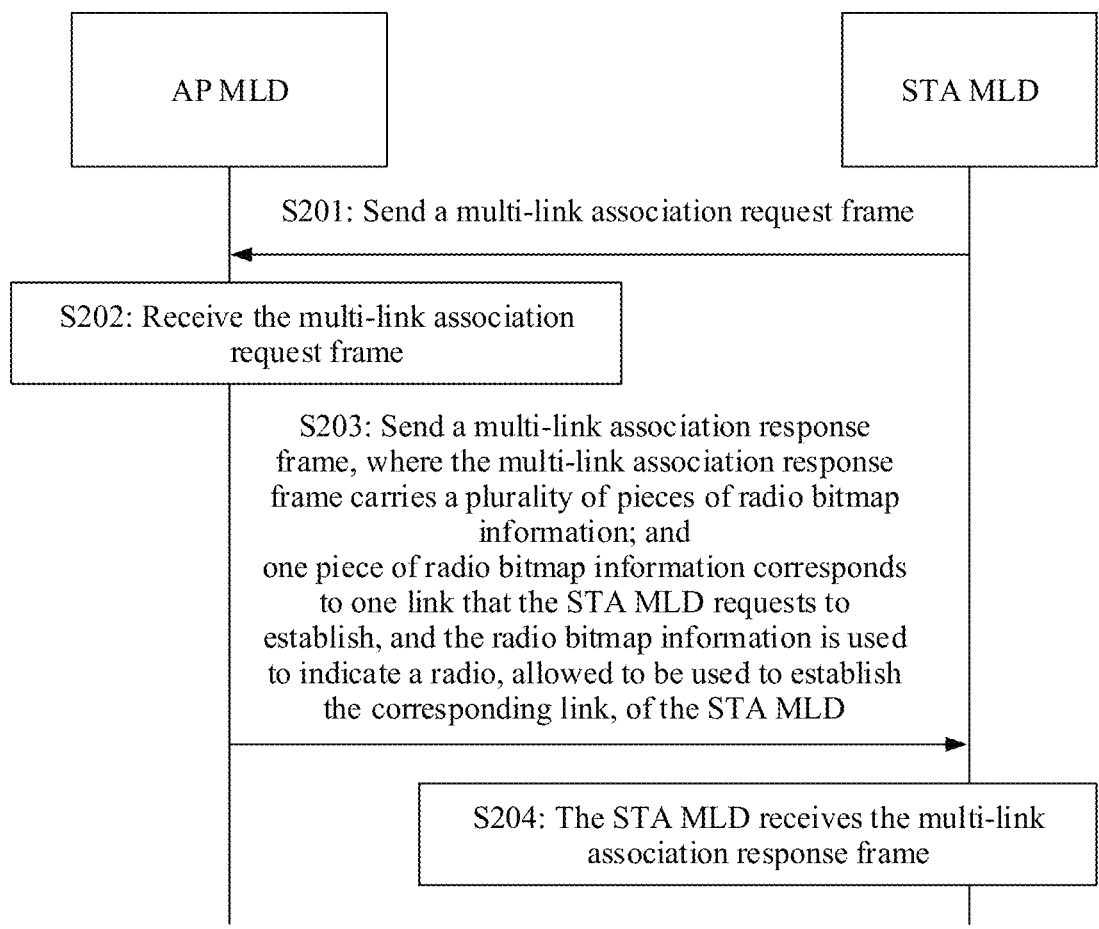
FIG. 6 is a schematic flowchart of a multi-link establishment method 200 according to an embodiment of this application.

This application further provides the multi-link establishment method 200. As shown in FIG. 6, the multi-link establishment method 200 is similar to the multi-link establishment method 100. For example, step S201 in FIG. 6 is the same as step S101 in FIG. 4, and S202 is the same as S102 in FIG. 4. An only difference is that in the multi-link establishment method 200, a multi-link association response frame in S203 and S204 carries a plurality of pieces of radio bitmap information. One piece of radio bitmap information corresponds to one link that the STA MLD requests to establish, and the radio bitmap information is used to indicate a radio allowed to be used to establish the corresponding link.

Radio bitmap information of a transmitted link is located in MLD-level info in a multi-link element. Radio bitmap information of a non-transmitted link is located in Per-link profile info in the multi-link element. In other words, the radio bitmap information in the MLD-level info in the multi-link element is used to indicate a correspondence between the transmitted link and each radio of the STA MLD. The radio bitmap information in the Per-link profile info in the multi-link element is used to indicate a correspondence between the corresponding non-transmitted link and each radio of the STA MLD.

Figure 7:
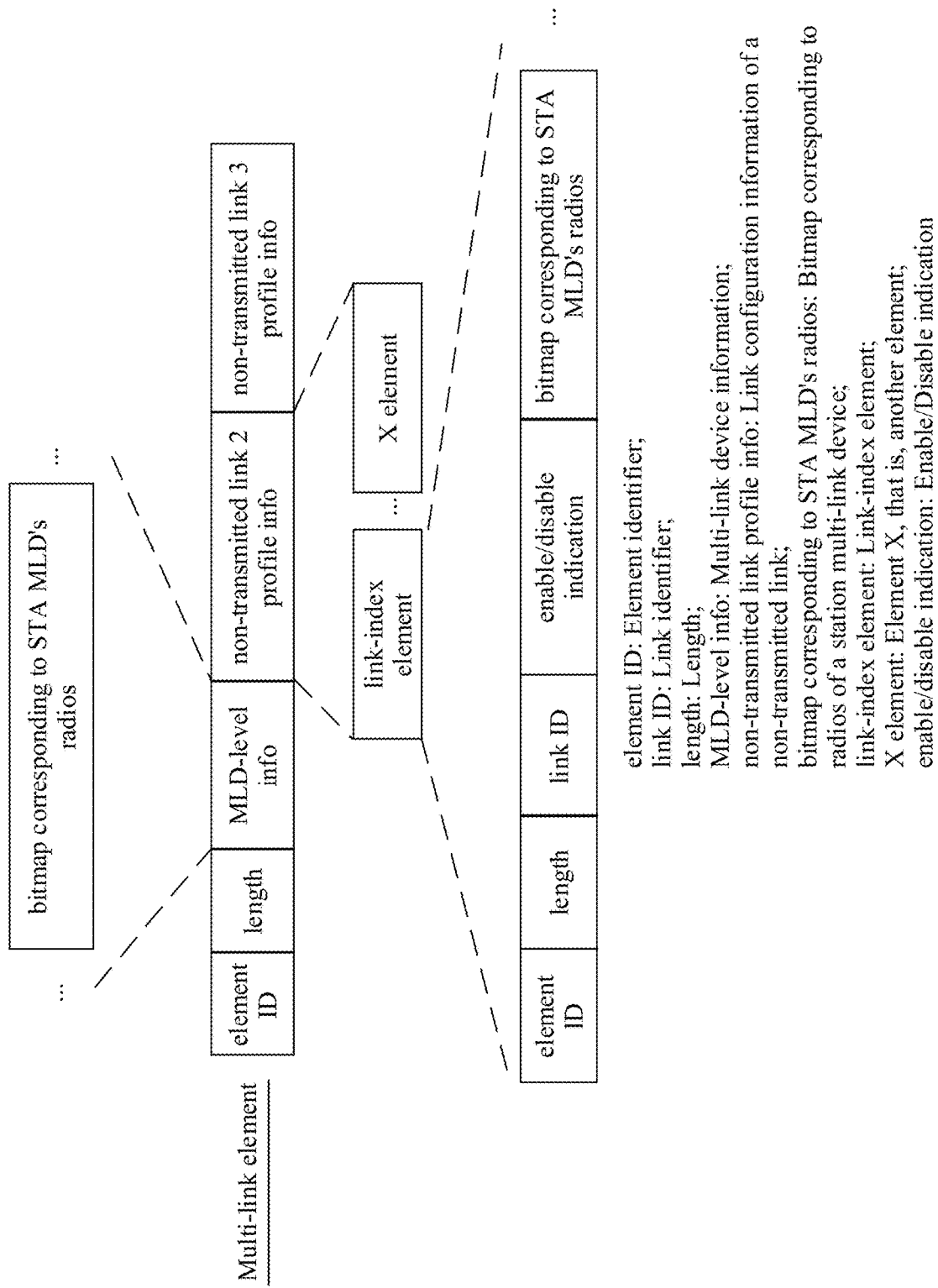
FIG. 7 is a schematic diagram of a structure of a multi-link element according to an embodiment of this application.

The radio frequency bitmap information may be referred to as a bitmap corresponding to non-AP MLD's radios field, or a bitmap corresponding to STA MLD's radios. For example, as shown in FIG. 7, it is assumed that a link 1 is a transmitted link, and a link 2 and a link 3 are non-transmitted links. In this case, as shown in FIG. 7, a bitmap corresponding to STA MLD's radios of the link 1 is located in MLD-level info in a multi-link element, and a bitmap corresponding to STA MLD's radios of the link 2 and a bitmap corresponding to STA MLD's radios of the link 3 are separately located in Per-link profile info in the multi-link element. Using the link 2 as an example, as shown in FIG. 7, the bitmap corresponding to STA MLD's radios of the link 2 is located in a link-index element of non-transmitted link 2 profile info in the multi-link element. In addition, the link-index element may further carry an element identifier (element ID), a length, a link identifier (link ID), and an enable/disable indication. The "enable/disable indication" may be translated as an "enable/disable indication".

A quantity of bits occupied by the radio bitmap information of the transmitted link and a quantity of bits occupied by the radio bitmap information of the non-transmitted link are both equal to the quantity of radios of the STA MLD. The radio quantity information carried in the multi-link association request frame helps determine the quantity of bits of the radio bitmap information or a length of the radio bitmap information.

Similarly, radio bitmap information of one link may also correspond to different description manners from another perspective. For example, radio bitmap information of one link is used to indicate a radio allowed to be used to establish the link, or used to indicate a radio, allowed to be used to establish the link, of the STA MLD. Radio bitmap information of each link is R bits, where R is the quantity of radios of the STA MLD. One of the R bits corresponds to one radio of the STA MLD, and indicates whether the corresponding radio is allowed to be used to establish the link. In addition, the bit, corresponding to each radio, in the radio bitmap information may be determined based on a sequence of the related information of the radios carried in the multi-link association request frame, or predefined.

For example, it is assumed that the STA MLD has two radios, namely, a radio 1 and a radio 2, and links that the STA MLD requests to establish are a link 1, a link 2, and a link 3. In this case, the radio bitmap information of each link is two bits. Bits, separately corresponding to the two radios, in every two bits may be: the $1^{st}$ bit corresponds to the radio 1, and the $2^{nd}$ bit corresponds to the radio 2. If radio bitmap information of the link 1 is 10, it indicates that a radio allowed to be used to establish the link 1 is the radio 1. If radio bitmap information of the link 2 is 10, it indicates that a radio allowed to be used to establish the link 2 is the radio 1. If radio bitmap information of the link 3 is 01, it indicates that a radio allowed to be used to establish the link 3 is the radio 2. It can be learned that the STA MLD may switch between the link 1 and the link 2 by using the radio 1.

Similar to the foregoing multi-link establishment method 100, in the multi-link establishment method 200, information such as whether a link is successfully established and links between which a radio may quickly switch may be learned, thereby greatly improving multi-link establishment flexibility. Specifically, when it is assumed that a value of one bit in the radio bitmap information of a link is zero, it indicates that a radio corresponding to the bit cannot establish the link. When a value of one bit in the radio bitmap information a link is one, it indicates that a radio corresponding to the bit is allowed to be used to establish the link. In this case, the quantity of radios of the STA MLD is R. If radio frequency bitmap information of a link is R zeros, it indicates that the link cannot be successfully established by using any radio of the STA MLD, that is, it implicitly indicates that the link fails to be established. If a plurality of bits in radio bitmap information of a link is one, it indicates that the link may be successfully established by using a plurality of radios of the STA MLD, where the plurality of radios are radios separately corresponding to the plurality of bits.

For example, it is assumed that the STA MLD has two radios, namely, a radio 1 and a radio 2, and radio bitmap information of one link is two bits. The $1^{st}$ bit corresponds to the radio 1, and the $2^{nd}$ bit corresponds to the radio 2. If the radio bitmap information of the link is 10, it indicates that the link may be established by using the radio 1. If the radio bitmap information of the link is 01, it indicates that the link may be established by using the radio 2. If the radio bitmap information of the link is 11, it indicates that the link may be established by using both the radio 1 and the radio 2. If the radio bitmap information of the link is 00, it indicates that the link cannot be established by using the radio 1 or the radio 2. Therefore, it may implicitly indicate that the link fails to be established.

It can be learned that, in the multi-link establishment method 100 and the multi-link establishment method 200, a radio supporting a plurality of frequency bands in the STA MLD may request to establish a plurality of links to the AP MLD, where the plurality of links share the radio. Because one radio of the STA MLD may communicate with the AP MLD on only one link at any time, after a plurality of links sharing the radio are successfully established, one of the links may be set to an enable status, and the others are set to a disable status. If the STA MLD switches from the link to another link, the link is switched from the enable status to the disable status, and a time-consuming link establishment operation does not need to be re-initiated. In other words, in this embodiment of this application, the radio supporting the plurality of frequency bands in the STA MLD switches between the plurality of links of the AP MLD, and the time-consuming link establishment operation does not need to be re-initiated.

In addition, in the multi-link establishment method 100 and the multi-link establishment method 200, for a case in which a same radio establishes a plurality of links, the multi-link association response frame further needs to carry other information, to notify the STA MLD of a link that is initially in the enable status and a link that is in the disable status. For example, link configuration information of each link in the multi-link association response frame may carry a status indication, to indicate whether the link is in the enable status or the disable status.

In addition, for a case in which a same link is allowed to be established by a plurality of radios, the multi-link association response frame further needs to carry other information, to notify the STA MLD of a radio initially allowed to be used to establish the link. For example, link configuration information of each link in the multi-link association response frame may carry an index of a MAC address of a radio, to notify the STA MLD of a radio initially establishing the link.

In addition, in the multi-link establishment method 100 and the multi-link establishment method 200, the radio bitmap information may be carried not only in the multi-link association response frame of the 1$^{st}$ association between the STA MLD and the AP MLD, but also in a reassociation response frame of a reassociation between the STA MLD and the AP MLD.

Embodiment 3

Figure 8:
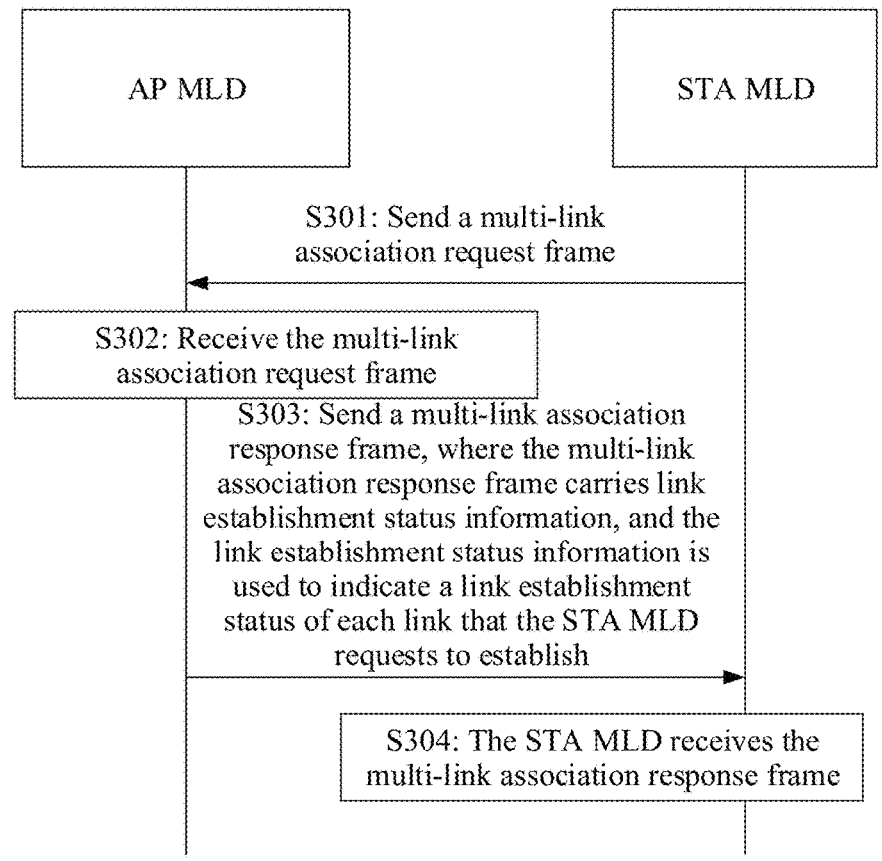
FIG. 8 is a schematic flowchart of a multi-link establishment method 300 according to an embodiment of this application.

This application further provides the multi-link establishment method 300. The multi-link establishment method 300 may indicate whether each link that the STA MLD requests to establish is successfully established. In other words, different from that a status code field in a request response frame indicates only whether the STA MLD is successfully associated with the AP MLD, in the multi-link establishment method 300, whether each link that the STA MLD requests to establish is successfully established may be indicated. As shown in FIG. 8, the multi-link establishment method 300 includes but is not limited to the following steps.

S301: The STA MLD sends a multi-link association request frame.

S302: The AP MLD receives the multi-link association request frame.

S303: The AP MLD sends a multi-link association response frame, where the multi-link association response frame includes link establishment status information, and the link establishment status information is used to indicate a link establishment status of each link that the STA MLD requests to establish.

S304: The STA MLD receives the multi-link association response frame.

Optionally, the multi-link association request frame and the multi-link association response frame in steps S301 to S304 may be a multi-link association request frame and a multi-link association response frame in the initial association process between the STA MLD and the AP MLD, or may be a reassociation request frame and a reassociation response frame in a reassociation process between the STA MLD and the AP MLD. In other words, the reassociation response frame may also carry the link establishment status information.

In the multi-link establishment method 300, the link establishment status information may include but is not limited to the following four optional implementations, to indicate the link establishment status of each link that the STA MLD requests to establish.

(1) The link establishment status information includes a status code field and link configuration information of a successfully established link in the links that the STA MLD requests to establish.

The status code field is used to indicate whether the STA MLD is successfully associated with the AP MLD. When the status code field indicates that the STA MLD is successfully associated with the AP MLD, the link establishment status information may carry the link configuration information of the successfully established link in the links that the STA MLD requests to establish. When the status code field indicates that the STA MLD fails to be associated with the AP MLD, the link establishment status information does not carry link configuration information of the links that the STA MLD requests to establish.

Whether the STA MLD is successfully associated with the AP MLD has the following two interpretations.

In one interpretation, whether the STA MLD is successfully associated with the AP MLD is related to whether there is the successfully established link in the plurality of links that the STA MLD requests to establish. If at least one link in the plurality of links that the STA MLD requests to establish is successfully established, it indicates that the STA MLD is successfully associated with the AP MLD. If none of the plurality of links that the STA MLD requests to establish is successfully established, it indicates that the STA MLD fails to be associated with the AP MLD.

In the other interpretation, whether the STA MLD is successfully associated with the AP MLD is related to whether a transmitted link in the plurality of links that the STA MLD requests to establish is successfully established. In other words, only when the transmitted link in the plurality of links that the STA MLD requests to establish is successfully established, it indicates that the STA MLD is successfully associated with the AP MLD. If the transmitted link in the plurality of links that the STA MLD requests to establish fails to be established, it indicates that the STA MLD fails to be associated with the AP MLD.

Therefore, in another implementation, the status code field may be used to indicate whether the transmitted link that the STA MLD requests to establish is successfully established, or a link establishment status of the transmitted link. Correspondingly, the link establishment status information includes link configuration information of a successfully established non-transmitted link in the links that the STA MLD requests to establish.

A manner in which the link establishment status information is carried in the multi-link association response frame is: The status code field is located in the multi-link association response frame, the link configuration information of the successfully established non-transmitted link is located in a per link profile info field of a multi-link element, and the link configuration information of the successfully established transmitted link is located in the multi-link association response frame in a form of an independent field.

For example, it is assumed that a link 1 is a transmitted link, a link 2 and a link 3 are non-transmitted links, and the AP MLD accepts establishment requests of the link 1, the link 2, and the link 3, that is, the link 1, the link 2, and the link 3 are all successfully established. As shown in FIG. 3, in the multi-link association response frame sent by the AP MLD, the status code field is located in the multi-link association response frame in a form of an independent field, and link configuration information of the link 2 and the link 3 is located in the per link profile info field in the multi-link element. In addition, link configuration information of the link 1 is located in the multi-link association response frame in a form of an independent field.

Optionally, the status code field and the link configuration information may alternatively be located in another position of the association response frame. This is not limited in this embodiment of this application.

A status code table corresponding to the status code field is shown in Table 3. When a value of the status code field is 0, it indicates that the STA MLD is successfully associated with the AP MLD. That is, at least one link in the plurality of links that the STA MLD requests to establish is successfully established, or the transmitted link in the plurality of links that the STA MLD requests to establish is successfully established. When the value of the status code field is 1, it indicates that the STA MLD fails to be associated with the AP MLD. That is, none of the plurality of links that the STA MLD requests to establish is successfully established, or the transmitted link in the plurality of links that the STA MLD requests to establish fails to be established. When the value of the status code field is 2, it indicates that TDLS is rejected, and an alternative option is provided. That is, direct link scheduling is rejected, but alternative scheduling is provided. In other words, meanings of the status code in Table 3 are for a multi-link device, and the meanings of the status code in Table 2 are for a single-link device.

TABLE 3

Status code table

| Status code | Name | Meaning |
|---|---|---|
| 0 | Succeed | The STA MLD is successfully associated with the AP MLD |
| 1 | Rejected, and rejected for an unspecified reason | The STA MLD fails to be associated with the AP MLD, and a failure reason is not specified |
| 2 | TDLS is rejected, and an alternative option is provided | Direct link scheduling is rejected, but alternative scheduling is provided |
| . . . | . . . | . . . |

One of the foregoing two optional interpretations of the status code field by the STA MLD may be determined by using a manner of predefining or signaling notification, to learn, based on the link establishment status information, the link establishment status of each link that the STA MLD requests to establish. In this implementation, an association status of the multi-link device is represented by using the status code field, and whether a link is successfully established is indicated based on whether link configuration information of the link is carried. It can be learned that, in this implementation, a link status of each link may be indicated, and the association response frame does not need to be modified, thereby helping improve compatibility of a protocol on a new device and an old device.

(2) The link establishment status information includes a status code field and link configuration information of a successfully established link in the links that the STA MLD requests to establish.

Compared with the foregoing first implementation of the link establishment status information, the link establishment status information in this implementation is the same. A difference lies in that the status code field is used to indicate that all or a part of the plurality of links that the STA MLD requests to establish are successfully established. Optionally, the status code field indicates that all the links that the STA MLD requests to establish are successfully established. The link establishment status information may include link configuration information of all the links that the STA MLD requests to establish.

In addition, the status code table corresponding to the status code field further includes status code. The status code indicates that a part of the plurality of links that the STA MLD requests to establish are successfully established.

For example, as shown in the following Table 4, when the status code is 0, it indicates that all of the plurality of links that the STA MLD requests to establish are successfully established. When the status code is 200, it indicates that a part of the links that the STA MLD requests to establish are successfully established. That is, in Table 4, the status code is newly added by extending Table 2, to indicate that a part of the links are successfully established. Optionally, the newly added status code may be represented by using a reserved value of the status code in Table 2.

TABLE 4

Status code table

| Status code | Name | Meaning |
|---|---|---|
| 0 | All links succeed | All the links that the STA MLD requests to establish are successfully established |
| 1 | Rejected, and rejected for an unspecified reason | Unspecified failure |
| 2 | TDLS is rejected, and an alternative option is provided | Direct link scheduling is rejected, but alternative scheduling is provided |
| . . . | . . . | . . . |
| 200 | A part of the links are successfully established | A part of the links that the STA MLD requests to establish are successfully established |

Optionally, a new status code table may be predefined. The new status code table may include only status code indicating that all the links that the STA MLD requests to establish are successfully established, status code indicating that a part of the links that the STA MLD requests to establish are successfully established, and status code indicating that all the links that the STA MLD requests to establish fail to be established.

In addition, a manner in which the link establishment status information is carried in the multi-link association response frame in this implementation is the same as that in the previous implementation, as shown in the multi-link association response frame shown in FIG. 3. Therefore, in this implementation, in addition to the link establishment status that may indicate establishment of each link, improvement on the multi-link association response frame is avoided, so that compatibility of this implementation on different devices may be improved.

(3) The link establishment status information includes a plurality of status code fields.

One status code field corresponds to one link that the STA MLD requests to establish, and the status code field is used to indicate a link establishment status of the corresponding link.

In other words, a quantity of status code fields in the link establishment status information is equal to a quantity of links that the STA MLD requests to establish, to indicate the link establishment status of each link by using the status code fields.

A manner in which the plurality of status code fields are carried in the multi-link association response frame may include but is not limited to the following two implementations, which are separately described below.

(a) The status code field of each link is carried in the multi-link association response frame in a manner of the status code field shown in FIG. 3.

Figure 9:
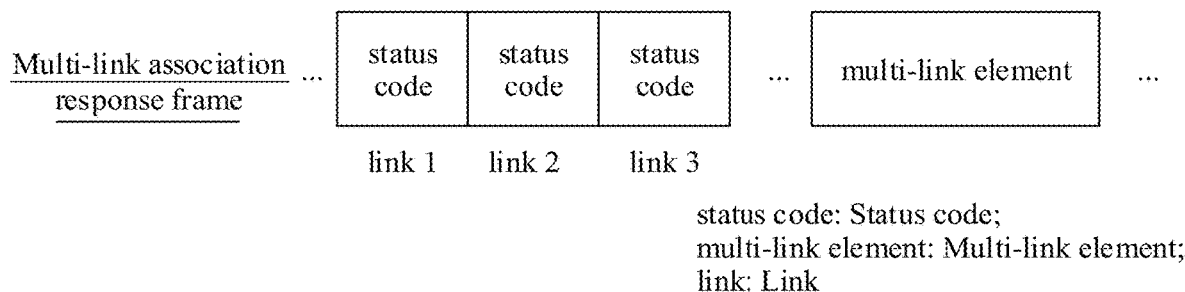
FIG. 9 is still another schematic diagram of a structure of a multi-link association response frame according to an embodiment of this application.

As shown in FIG. 9, it is assumed that the STA MLD requests to establish three links, which are separately a link 1, a link 2, and a link 3. A status code field of each of the three links may be located in the multi-link association response frame in a manner shown in FIG. 9. An arrangement order or a position of the status code field of each link in the multi-link association response frame is not limited. For example, the arrangement order of the status code field of each link in the multi-link association response frame is consistent with an arrangement order of link configuration information of links in the multi-link association response frame.

(b) A position of the status code field of each link in the multi-link association response frame is related to whether the link is a transmitted link or a non-transmitted link.

A status code field of the transmitted link is the status code field in the multi-link association response frame, namely, the status code field in the multi-link association response frame shown in FIG. 3. A status code field of the non-transmitted link is located in a multi-link element in the multi-link association response frame.

Figure 10:
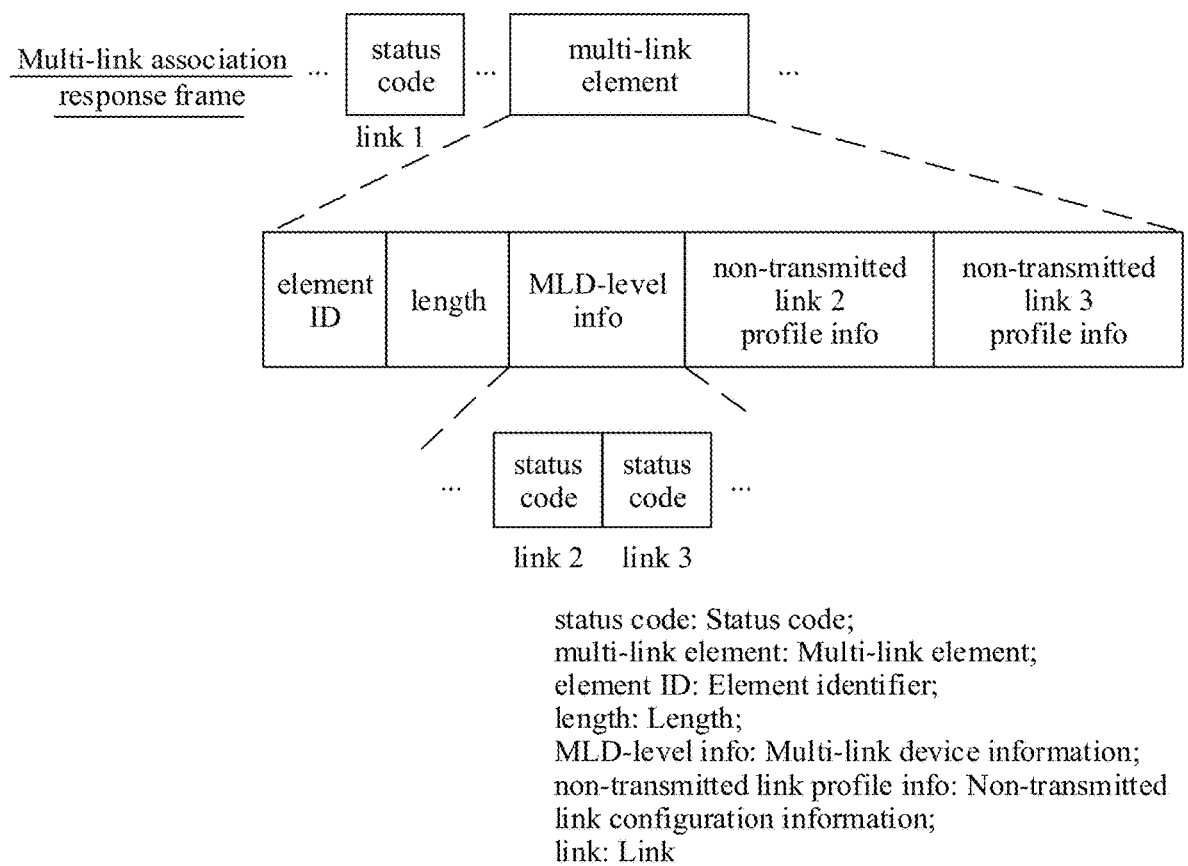
FIG. 10 is still another schematic diagram of a structure of a multi-link association response frame according to an embodiment of this application.

In an implementation, the status code field of each non-transmitted link may be located in MLD-level info in the multi-link element. For example, it is assumed that the STA MLD requests to establish three links, which are separately a link 1, a link 2, and a link 3. The link 1 is a transmitted link, and the link 2 and the link 3 are non-transmitted links. As shown in FIG. 10, a status code field of the link 1 is directly carried in a multi-link association response frame in a form of an independent field, and a status code field of the link 2 and a status code field of the link 3 are located in MLD-level info of a multi-link element.

Figure 11:
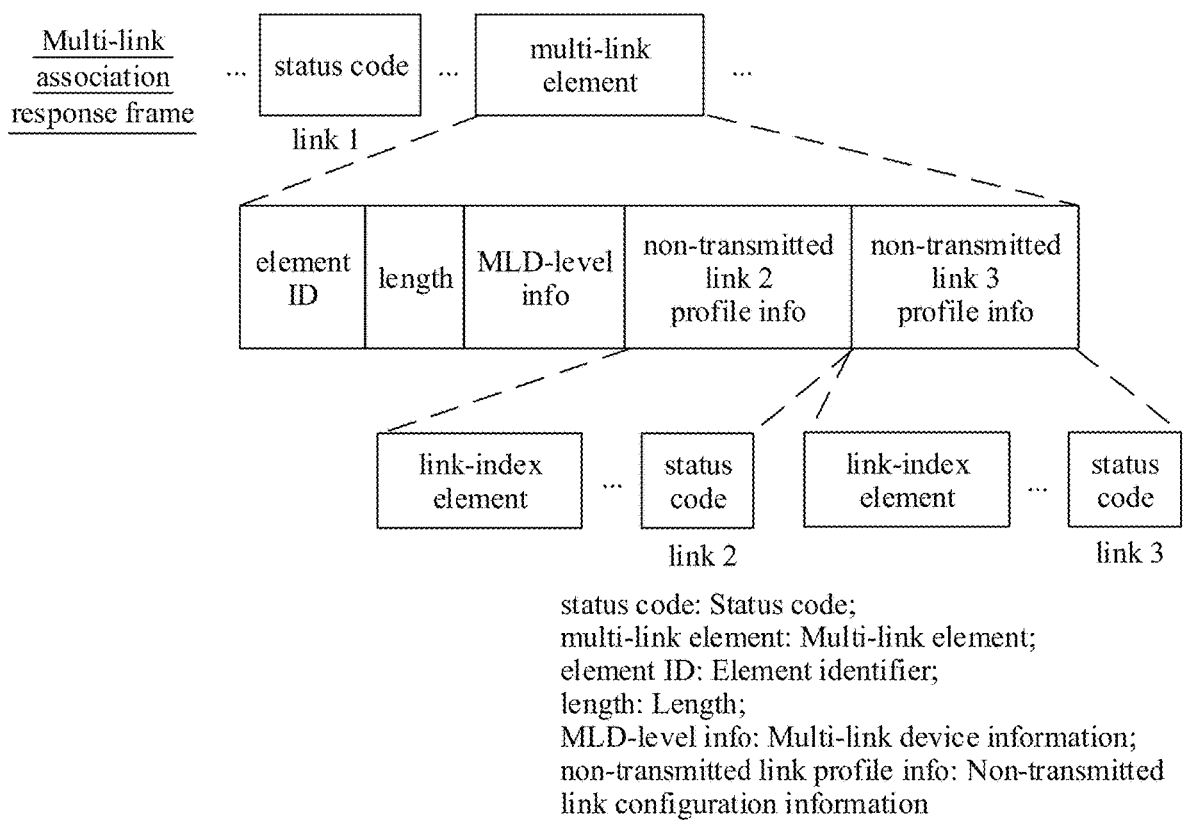
FIG. 11 is still another schematic diagram of a structure of a multi-link association response frame according to an embodiment of this application.

In another implementation, the status code field of each non-transmitted link may be located in the per link profile info field in the multi-link element. For example, it is assumed that the STA MLD requests to establish three links, which are separately a link 1, a link 2, and a link 3. The link 1 is a transmitted link, and the link 2 and the link 3 are non-transmitted links. As shown in FIG. 11, a status code field of the link 1 is directly carried in a multi-link association response frame in a form of an independent field, and a status code field of the link 2 and a status code field of the link 3 are separately located in respective link configuration information in a multi-link element.

In an implementation, the status code field of each link includes two pieces of optional status code, for example, first status code and second status code. The first status code indicates that the link corresponding to the status code field is successfully established, and the second status code indicates that the link corresponding to the status code field fails to be established.

In another implementation, in addition to the status code indicating whether the link is successfully established, the optional status code of the status code field of each link may further include one or more types of status code indicating "that the link fails to be established and a failure reason".

In still another implementation, the optional status code of the status code field of each link includes but is not limited to the status code shown in Table 2. In addition, the status code indicating an association status between the STA MLD and the AP MLD in Table 2 further needs to be modified to status code indicating a link establishment status of a link. For example, if a value of the status code field associated with the link 1 is 0, it indicates that the link 1 is successfully established. If the value of the status code field associated with the link 1 is 2, it indicates that the link 1 requested to be established is rejected, and a rejection reason is not specified. If the value of the status code field associated with the link 1 is 3, it indicates that the link 1 requested to be established is rejected by TDLS, and an alternative option is provided. In other words, direct link scheduling is rejected, but alternative scheduling is provided.

Optionally, one or more of the optional status code of the status code field of the link described in the foregoing implementations may be used based on signaling overheads.

(4) The link establishment status information includes a status code field and a link establishment status bitmap.

For related descriptions of the status code field, refer to the first and second implementations of the link establishment status information. To be specific, the status code field, as described in the first implementation, is used to indicate whether the STA MLD is successfully associated with the AP MLD. For details, refer to the content described in the first implementation. Alternatively, the status code field, as described in the second implementation, is used to indicate whether all or a part of the plurality of links requested to be established are successfully established. For details, refer to the content described in the second implementation. The following describes the link establishment status bitmap in detail.

In an implementation, the link establishment status bitmap is used to indicate whether each link that the STA MLD requests to establish is successfully established. A quantity of bits in the link establishment status bitmap is equal to a total quantity of links that the STA MLD requests to establish.

For example, the total quantity of links that the STA MLD requests to establish is equal to N, the link establishment status bitmap comprises N bits, and each bit corresponds to one link. If a value of a bit corresponding to the link is equal to 1, it indicates that the link is successfully established. If the value of the bit corresponding to the link is equal to 0, it indicates that the link fails to be established.

Figure 12:
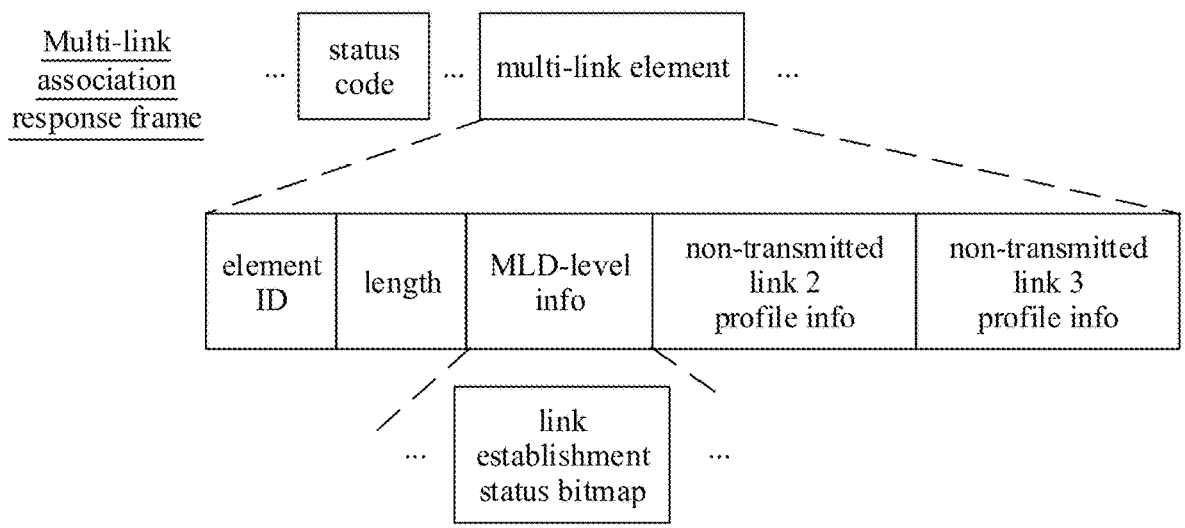
FIG. 12 is still another schematic diagram of a structure of a multi-link association response frame according to an embodiment of this application.

Optionally, the status code field is an independent field of the multi-link association response frame, and the link establishment status bitmap is located in multi-link device information in a multi-link element in the association response frame, as shown in FIG. 12. The correspondence between each bit in the link establishment status bitmap and the link may be determined in sequence based on values of link identifiers.

For example, it is assumed that the STA MLD requests to establish three links, which are separately a link 1, a link 2, and a link 3. The link establishment status bitmap is three bits, and link identifiers that are arranged in ascending order are: a link identifier of the link 1, a link identifier of the link 2, and a link identifier of the link 3. In other words, the $1^{st}$ bit in the link establishment status bitmap corresponds to the link 1, the $2^{nd}$ bit corresponds to the link 2, and the $3^{rd}$ bit corresponds to the link 3. It is assumed that, as shown in FIG. 12, the value of the status code field indicates that the STA MLD is successfully associated with the AP MLD, and the link establishment status bitmap is 101, it indicates that the link 1 and the link 3 are successfully established, and the link 2 fails to be established.

In another implementation, if the status code field indicates, only when the transmitted link is successfully established, that the STA MLD is successfully associated with the AP MLD, or that a part of the plurality of links that the STA MLD requests to establish are successfully established, the quantity of bits in the link establishment status bitmap may be equal to N−1. In other words, the link establishment status bitmap is used to indicate whether each non-transmitted link in the links that the STA MLD requests to establish is successfully established. For example, it is assumed that a status code field shown in FIG. 14 indicates that the STA MLD is successfully associated with the AP MLD, and a link 1 is a transmitted link. If the link establishment status bitmap may be 01, the link establishment status bitmap separately indicates a link establishment status of a non-transmitted link 2 and a link establishment status of a non-transmitted link 3, that is, the link 2 fails to be established, and the link 3 is successfully established.

In this implementation, an example in which the link establishment status includes two link statuses, namely, that the link is successfully established and that the link fails to be established, is used. Optionally, the link establishment status bitmap is further used to indicate another link status of each link that the STA MLD requests to establish. In other words, a quantity of bits corresponding to each link in the link establishment status bitmap may be determined based on a type that needs to be indicated and that is of the link status of each link.

In addition, a difference among the foregoing implementations of the link establishment status information lies in that structures or content of the link establishment status information are different, and a problem to be resolved and a beneficial effect to be achieved are the same. Therefore, the foregoing implementations of this embodiment of this application belong to a same invention concept.

It can be learned that, in this embodiment of this application, signaling overheads as low as possible can be used to indicate whether each link that the STA MLD requests to establish is successfully established, that is, a part of the links requested to be established between the STA MLD and the AP MLD are allowed to fail to be established, thereby greatly improving multi-link establishment flexibility.

Embodiment 4

Figure 13:
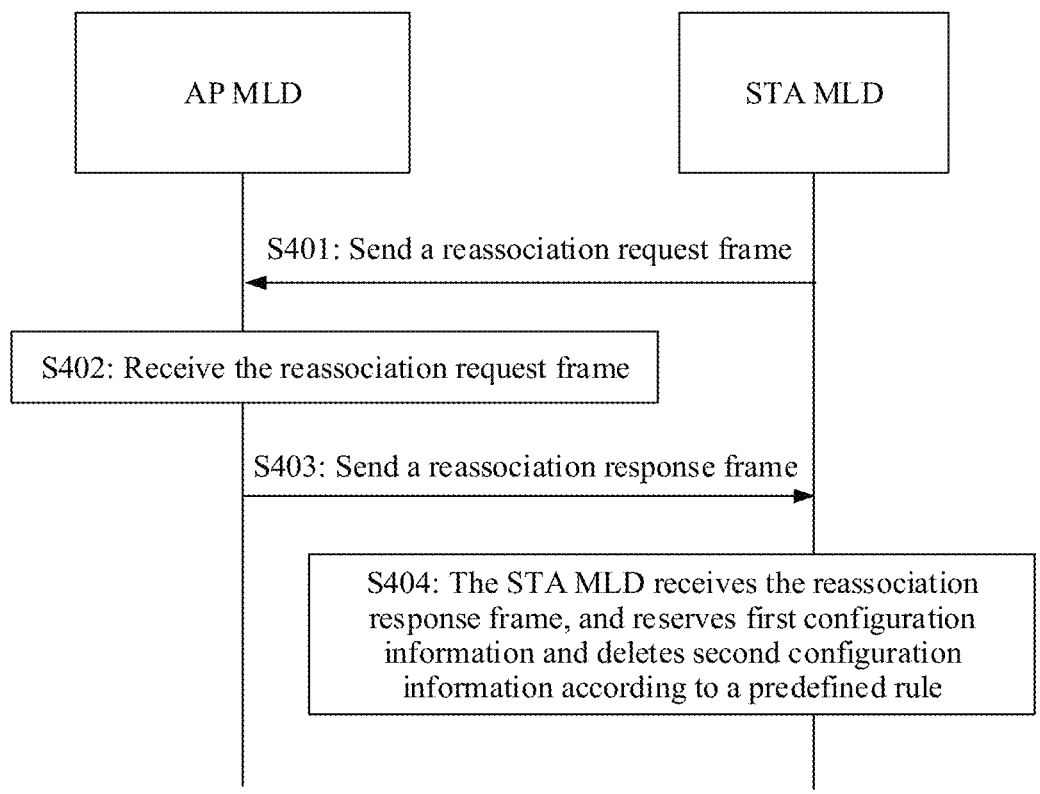
FIG. 13 is a schematic flowchart of a multi-link establishment method 400 according to an embodiment of this application.

FIG. 13 is a schematic flowchart of the multi-link establishment method 400 according to an embodiment of this application. As shown in FIG. 13, the multi-link establishment method 400 includes but is not limited to the following steps.

S401: The STA MLD sends a reassociation request frame.

S402: The AP MLD receives the reassociation request frame.

S403: The AP MLD sends a reassociation response frame.

The AP MLD may determine the reassociation response frame based on the reassociation request frame. For example, access point-side information that needs to be carried in the reassociation response frame is determined based on station-side information carried in the reassociation request frame.

S404: The STA MLD receives the reassociation response frame, and reserves first configuration information and deletes second configuration information according to a predefined rule.

The reassociation request frame is used by the STA MLD to re-initiate an association operation to the associated AP MLD, to help re-initiate the association operation when the STA MLD needs to change capability information or an associated related feature parameter. The reassociation response frame is used to respond to the reassociation request frame. The reassociation request frame and the reassociation response frame may also carry a multi-link element.

Both the first configuration information and the second configuration information are configuration information stored after the STA MLD is associated with the AP MLD. The first configuration information is configuration information that needs to be reserved in a reassociation operation, and the second configuration information is configuration information that needs to be deleted in the reassociation operation.

For example, the first configuration information includes but is not limited to: a block acknowledgment protocol, a sequence number, a packet number, a duplicate detection cache, a fragmentation and reassembly buffer, and a buffered media access control service data unit (MSDU). The second configuration information includes but is not limited to: an enhanced distributed channel access (EDCA) function status, to-be-transmitted data in a queue, a power management mode, a wireless network management sleep mode, and the like. The buffered MSDU may also be referred to as an MSDU of a queue.

In an implementation, the predefined rule is used to indicate configuration information that needs to be reserved in the STA MLD in the reassociation operation, that is, the predefined rule indicates content of the first configuration information. The second configuration information is other MLD-related information other than the first configuration information in the STA MLD, and may be deleted by default. In another implementation, the predefined rule is used to indicate configuration information that needs to be deleted in the STA MLD in the reassociation operation, that is, the predefined rule indicates content of the second configuration information. The first configuration information is other MLD-related information other than the second configuration information in the STA MLD, and may be reserved by default. In still another implementation, the predefined rule is used to indicate configuration information that needs to be deleted and configuration information that needs to be reserved in the STA MLD in the reassociation operation, that is, the predefined rule indicates content of the first configuration information and content of the second configuration information. Optionally, an operation of deleting or reserving other MLD-related information other than the first configuration information and the second configuration information in the STA MLD is not limited in this embodiment of this application.

It can be learned that, in the multi-link establishment method, when the plurality of links are reestablished between the STA MLD and the AP MLD by using the reassociation request frame and the reassociation response frame, the predefined rule may further be used to reserve a part of configuration information, thereby reducing signaling overheads caused by the reassociation operation.

Optionally, the multi-link establishment methods described in Embodiment 1 to Embodiment 3 may also be used with reference to the reassociation-related operation described in Embodiment 4 of this application. To be specific, after the STA MLD is associated with the AP MLD, if the STA MLD initiates the reassociation operation, a part of configuration information may be reserved according to the foregoing described implementation, to reduce signaling overheads caused by the reassociation operation.

Embodiment 5

This application further provides the multi-link establishment method 500. A difference between the multi-link establishment method 500 and the multi-link establishment method 400 lies in that, in the multi-link establishment method 500, reassociation information may be used to explicitly indicate the configuration information that needs to be reserved in the reassociation operation between the STA MLD and the AP MLD. Refer to a schematic flowchart of the multi-link establishment method 500 shown in FIG. 14. The multi-link establishment method 500 includes but is not limited to the following steps.

S501: The STA MLD sends a reassociation request frame.

S502: The AP MLD receives the reassociation request frame.

S503: The AP MLD sends a reassociation response frame to the STA MLD, where the reassociation response frame carries reassociation information, and the reassociation information is used to indicate whether each parameter in association configuration information is reserved.

Optionally, the reassociation response frame carries reassociation information, and the reassociation information is used to indicate whether each parameter in association configuration information is deleted. Optionally, the reassociation information may also be referred to as configuration information update information, or the like. The name is not limited in this embodiment of this application.

The association configuration information is stored by the STA MLD after the STA MLD is associated with the access point multi-link device AP MLD. Optionally, the association configuration information is a part or all of configuration information stored by the STA MLD after the STA MLD is associated with the AP MLD. Optionally, the parameter included in the association configuration information is predefined, or is notified by the AP MLD by using signaling. For example, the association configuration information includes but is not limited to: a block acknowledgment protocol, a sequence number, a packet number, a duplicate detection cache, a fragmentation and reassembly buffer, and a buffered media access control service data unit (MSDU).

For example, the association configuration information may include only configuration information that needs to be considered whether to be reserved in the reassociation operation, and configuration information, other than the association configuration information, stored by the STA MLD may be deleted by default. For example, the association configuration information may include only configuration information that needs to be considered whether to be deleted in the reassociation operation, and configuration information, other than the association configuration information, stored by the STA MLD may be reserved by default.

S504: The STA MLD receives the reassociation response frame.

The reassociation request frame is used by the STA MLD to re-initiate an association operation to the associated AP MLD, to help re-initiate the association operation when the STA MLD needs to change capability information or an associated related feature parameter. The reassociation response frame is used to respond to the reassociation request frame. The reassociation request frame and the reassociation response frame may also carry a multi-link element.

In an implementation, the reassociation information includes one or more bits. One bit corresponds to one or more parameters in the association configuration information, and the bit is used to indicate whether the corresponding one or more parameters are reserved.

For example, when a value of the bit is a first value, it indicates that the one or more parameters corresponding to the bit are reserved. When the value of the bit is a second value, it indicates that the one or more parameters corresponding to the bit are deleted. The first value may be 1, the second value may be 0, and vice versa. Specifically, the one or more parameters, corresponding to each bit in the reassociation information, in the association configuration information may be predefined or learned by using signaling.

A manner in which the reassociation information is carried in the reassociation response frame includes but is not limited to the following three manners. A first carrying manner is: The reassociation information is carried in the reassociation response frame in a manner of a reassociation element. A second carrying manner is: The reassociation information is carried, in a manner of a reassociation field, in multi-link device information in a multi-link element in the reassociation response frame. A third carrying manner is: The reassociation information is carried in the reassociation response frame in a manner of an independent field. The following describes the manners in detail.

(1) The reassociation information is carried in the reassociation response frame in a manner of a reassociation element.

Figure 15:
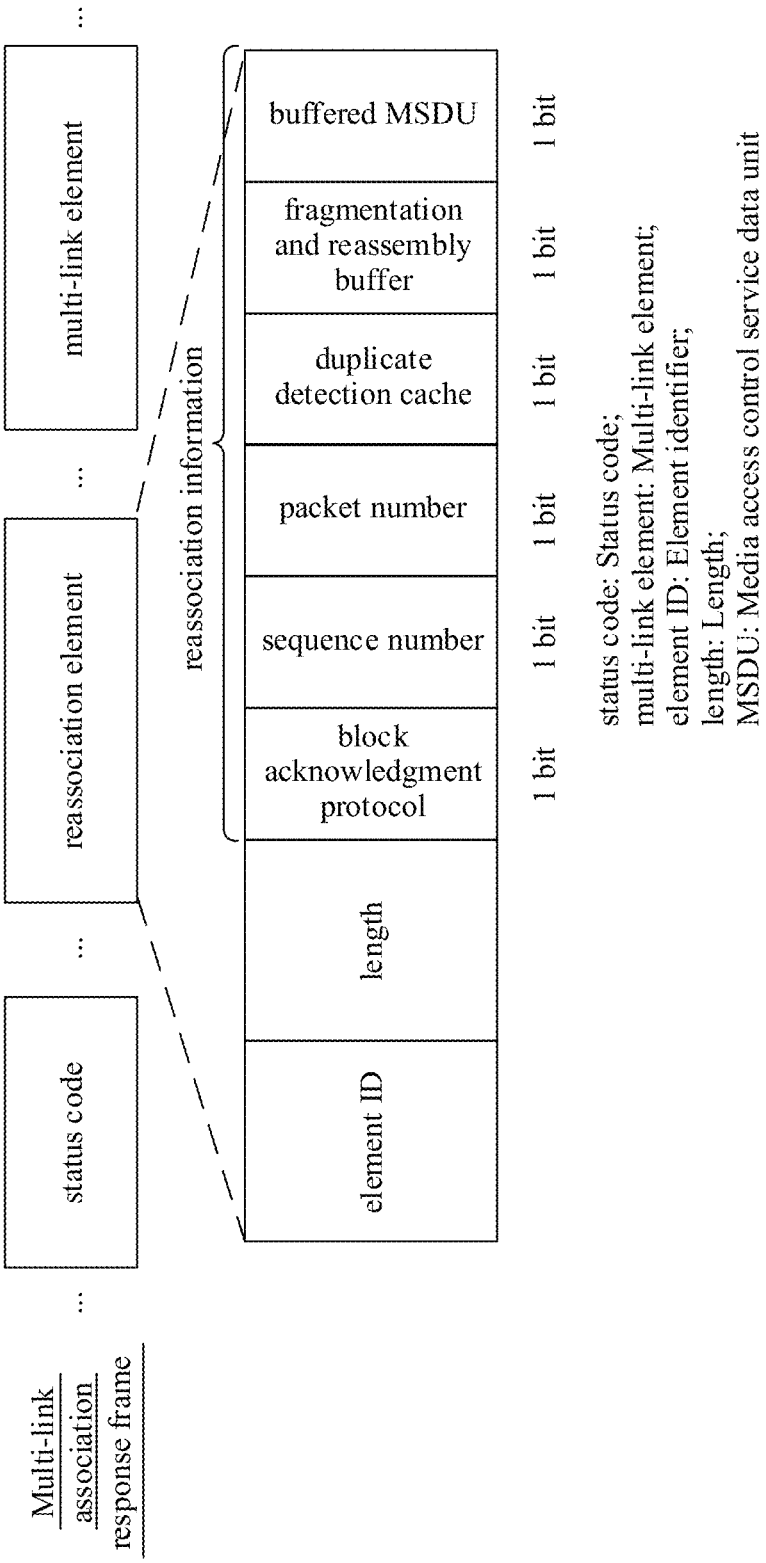
FIG. 15 is still another schematic diagram of a structure of a multi-link association response frame according to an embodiment of this application.
Figure 16:
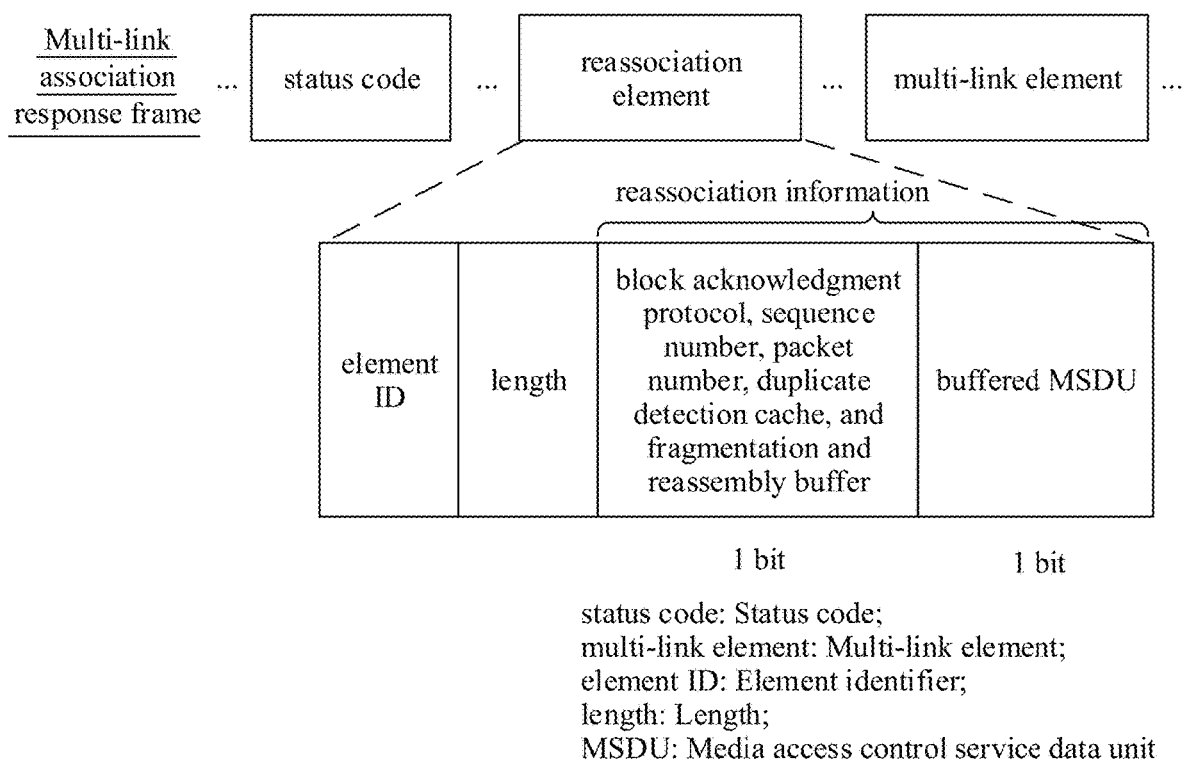
FIG. 16 is still another schematic diagram of a structure of a multi-link association response frame according to an embodiment of this application.

The reassociation element may also be referred to as a configuration information indication element, or the like in the reassociation response frame. This is not limited in this embodiment of this application. Optionally, a structure of the reassociation element is shown in FIG. 15 and FIG. 16. The reassociation element is carried in the reassociation response frame, and includes an element identifier (element ID), a length, and reassociation information. A quantity of bytes or bits occupied by the element identifier, a quantity of bytes or bits occupied by the length, and a quantity of bytes or bits occupied by the reassociation information may be predefined. The element identifier is used to indicate that the element is the reassociation element. The length is used to indicate a total quantity of bits or bytes between a start of a bit occupied by the length field to an end of a bit occupied by the reassociation information.

In one case, the reassociation information includes a plurality of bits. One bit corresponds to one parameter in the association configuration information, and is used to indicate whether the corresponding parameter is reserved.

For example, as shown in FIG. 15, it is assumed that the reassociation information is six bits, and the six bits are respectively in a one-to-one correspondence with a block acknowledgment protocol, a sequence number, a packet number, a duplicate detection cache, a fragmentation and reassembly buffer, and a buffered MSDU in the association configuration information. Assuming that the reassociation information read by the STA MLD from the reassociation response frame is 100001, the STA MLD may reserve the block acknowledgment protocol and the buffered MSDU in the STA MLD, and deletes the sequence number, the packet number, the duplicate detection cache, the fragmentation and reassembly buffer in the STA MLD.

In another case, the reassociation information includes a plurality of bits. One bit corresponds to one or more parameters in the association configuration information, and the bit is used to indicate whether the corresponding one or more parameters are reserved.

For example, as shown in FIG. 16, the reassociation information is two bits. The $1^{st}$ bit corresponds to a block acknowledgment protocol, a sequence number, a packet number, a duplicate detection cache, and a fragmentation and reassembly buffer in the association configuration information, and is used to indicate whether the block acknowledgment protocol, the sequence number, the packet number, the duplicate detection cache, and the fragmentation and reassembly buffer are reserved. The $2^{nd}$ bit corresponds to a buffered MSDU in the association configuration information, and is used to indicate whether the buffered MSDU is reserved. Assuming that the reassociation information read by the STA MLD from the reassociation response frame is 11, the STA MLD may reserve the block acknowledgment protocol, the sequence number, the packet number, the duplicate detection cache, the fragmentation and reassembly buffer, and the buffered MSDU in the STA MLD.

(2) The reassociation information is carried, in a manner of a reassociation field, in MLD-level info in a multi-link element in the reassociation response frame.

Figure 17:
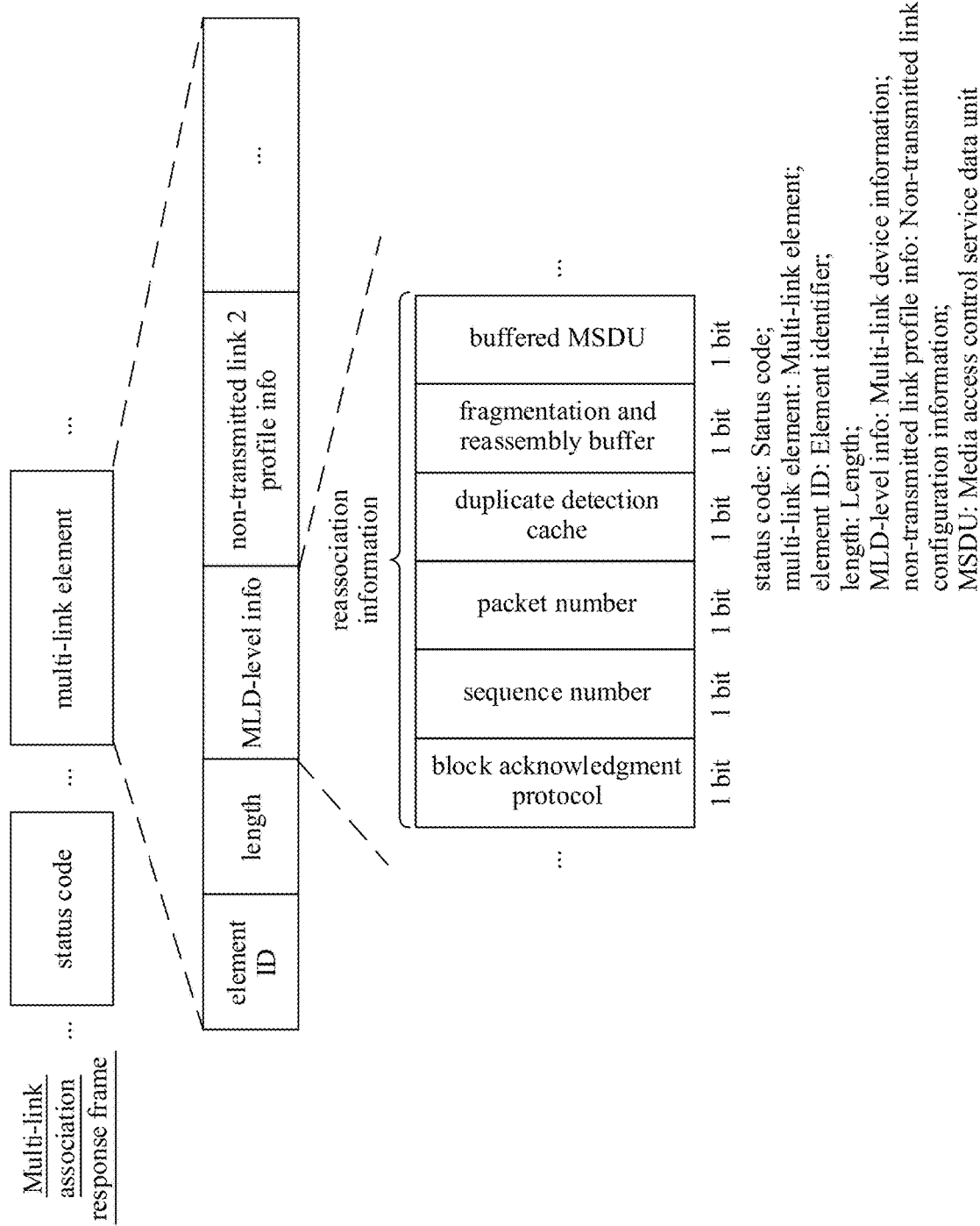
FIG. 17 is still another schematic diagram of a structure of a multi-link association response frame according to an embodiment of this application.
Figure 18:
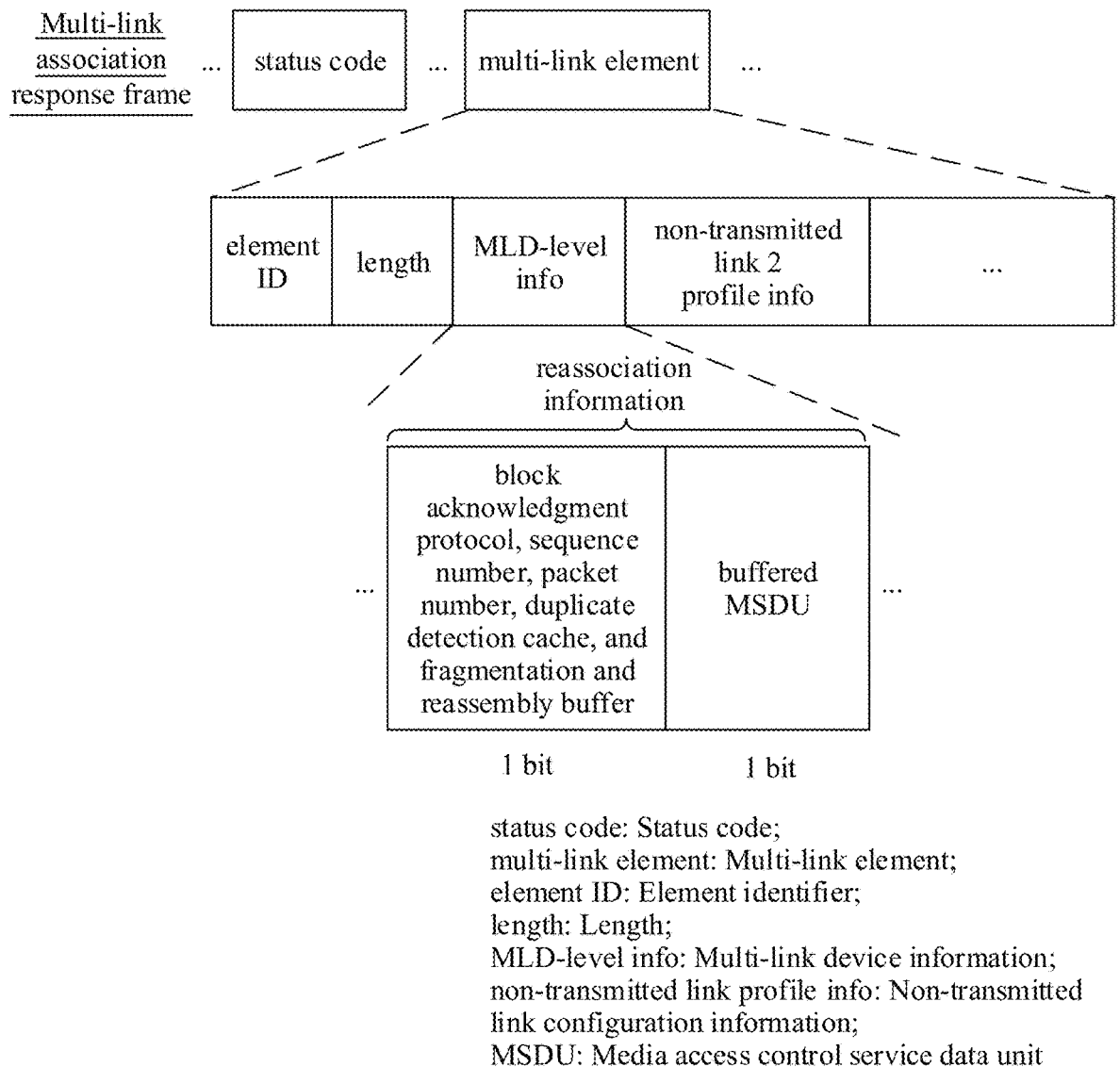
FIG. 18 is still another schematic diagram of a structure of a multi-link association response frame according to an embodiment of this application.

The reassociation information may be referred to as a reassociation domain, a reassociation field, or the like in the multi-link element in the reassociation response frame. For example, a structure of the reassociation information in the reassociation response frame is shown in FIG. 17 and FIG. 18. The reassociation information is carried in the multi-link device information (MLD-level info) in the reassociation response frame. A quantity of bytes or bits occupied by the reassociation information may be predefined or notified by using signaling. For example, for the reassociation information shown in FIG. 17 or FIG. 18, it is assumed that the quantity of bits occupied by the reassociation information is six bits as shown in FIG. 17, or two bits as shown in FIG. 18.

In an implementation, the reassociation information may be carried only in the reassociation response frame. In another implementation, in addition to being carried in the reassociation response frame, the reassociation information may alternatively be carried in the reassociation request frame. The reassociation information carried in the reassociation request frame may also have the features described in the foregoing implementations. A difference between the reassociation information carried in the reassociation request frame and the reassociation information carried in the reassociation response frame lies in that, the reassociation information carried in the reassociation request frame is used to indicate whether each parameter, requested by the STA MLD, in the association configuration information in the reassociation operation between the STA MLD and the AP MLD is reserved, and the reassociation information carried in the reassociation response frame is used to indicate each parameter, requested by the AP MLD to be reserved by the STA MLD, in the association configuration information in the reassociation operation between the STA MLD and the AP MLD is reserved.

Optionally, in addition to reserving a part of the parameters in the association configuration information and deleting the other part of the parameters in the association configuration information based on the reassociation information, the STA MLD may delete or reserve configuration information other than the association configuration information in the STA MLD by default. This is not limited in this embodiment of this application.

It can be learned that, in the multi-link establishment method 400, in the reassociation process, the parameter that needs to be reserved is explicitly indicated by using the reassociation information, thereby reducing signaling overheads caused by reassociation, and improving flexibility of notifying the STA MLD of the parameter that needs to be reserved.

Optionally, the multi-link establishment methods described in Embodiment 1 to Embodiment 3 may also be used with reference to the reassociation-related operation described in Embodiment 5 of this application. To be specific, after the STA MLD is associated with the AP MLD, if the STA MLD initiates the reassociation operation, a part of configuration information may be reserved according to the foregoing described implementation, to reduce signaling overheads caused by the reassociation operation.

In the foregoing embodiments provided in this application, the methods provided in the embodiments of this application are separately described from perspectives of the AP MLD and the STA MLD. To implement functions in the methods provided in the foregoing embodiments of this application, the AP MLD and the STA MLD each may include a hardware structure and a software module, to implement the foregoing functions in a form of the hardware structure, the software module, or a combination of the hardware structure and the software module. A function in the foregoing functions may be performed in a manner of the hardware structure, the software module, or a combination of the hardware structure and the software module. The following describes communication apparatuses in the embodiments of this application with reference to FIG. 19 to FIG. 21. The communication apparatus is an access point in an access point multi-link device or a station in a station multi-link device. Further, the communication apparatus may be an apparatus in an AP MLD, or an apparatus in a STA MLD. In addition, the apparatus may be a multi-link device, an apparatus in the multi-link device, or a processor or a chip system in the multi-link device.

Figure 19:
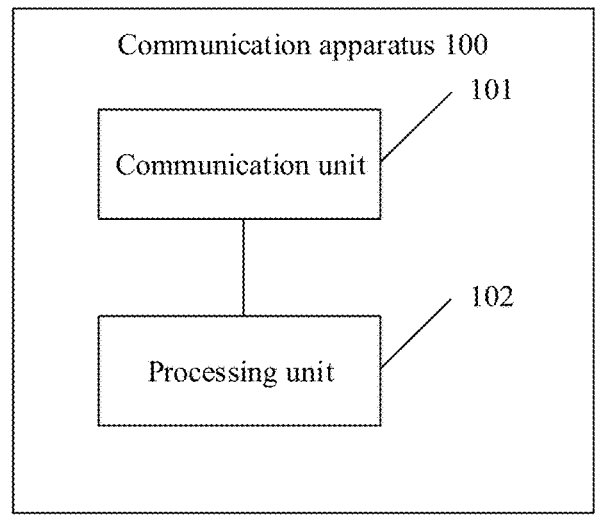
FIG. 19 is a schematic diagram of a structure of a communication apparatus 100 according to an embodiment of this application.

A communication apparatus 100 shown in FIG. 19 may include a communication unit 101 and a processing unit 102. The processing unit 102 is configured to process data. The communication unit 101 is integrated with a receiving unit and a sending unit. The communication unit 101 may also be referred to as a transceiver unit. Alternatively, the communication unit 101 may be split into a receiving unit and a sending unit. Specifically:

When the communication apparatus shown in FIG. 19 is configured to perform the method performed by the STA MLD in the method embodiment described in FIG. 4:

The processing unit 102 is configured to determine a multi-link association request frame; and
    the communication unit 101 is configured to send the multi-link association request frame, where
    the communication unit 101 is further configured to receive a multi-link association response frame, and
    the multi-link association response frame carries radio bitmap information, and the radio bitmap information is used to indicate a radio, allowed to be used to establish each link that the STA MLD requests to establish, of the STA MLD.

When the communication apparatus shown in FIG. 19 is configured to perform the AP MLD the method performed by in the method embodiment described in FIG. 4:
    the communication unit 101 is configured to receive a multi-link association request frame; and
    the processing unit 102 is configured to determine a multi-link association response frame, wherein
    the communication unit 101 is further configured to send the multi-link association response frame, and
    the multi-link association response frame carries radio bitmap information, and the radio bitmap information is used to indicate a radio, allowed to be used to establish each link that a STA MLD requests to establish, of the STA MLD.

Applicable to the STA MLD and the AP MLD in the method embodiment described in FIG. 4, the radio bitmap information is carried in multi-link device information in a multi-link element.

When the communication apparatus shown in FIG. 19 is configured to perform the STA MLD the method performed by in the method embodiment described in FIG. 6:

The processing unit 102 is configured to determine a multi-link association request frame; and
    the communication unit 101 is configured to send the multi-link association request frame, where
    the communication unit 101 is further configured to receive a multi-link association response frame, and the multi-link association response frame carries a plurality of pieces of radio bitmap information, one piece of radio bitmap information corresponds to one link that the STA MLD requests to establish, and the radio bitmap information is used to indicate a radio, allowed to be used to establish the corresponding link, of the STA MLD.

When the communication apparatus shown in FIG. 19 is configured to perform the AP MLD the method performed by in the method embodiment described in FIG. 6:
the communication unit 101 is configured to receive a multi-link association request frame; and
the processing unit 102 is configured to determine a multi-link association response frame, wherein
the communication unit 101 is further configured to send the multi-link association response frame, and
the multi-link association response frame carries a plurality of pieces of radio bitmap information, one piece of radio bitmap information corresponds to one link that a STA MLD requests to establish, and the radio bitmap information is used to indicate a radio, allowed to be used to establish the corresponding link, of the STA MLD.

Applicable to the STA MLD and the AP MLD in the method embodiment described in FIG. 6, as shown in the related content in FIG. 7, radio bitmap information of a transmitted link that the STA MLD requests to establish is carried in multi-link device information in a multi-link element in the multi-link association response frame; and radio bitmap information of a non-transmitted link that the STA MLD requests to establish is carried in link configuration information of the non-transmitted link in the multi-link element.

Applicable to the STA MLDs and the AP MLDs in the method embodiments described in FIG. 4 and FIG. 6, the multi-link association request frame carries radio quantity information, and the radio quantity information is used to indicate a quantity of radios of the STA MLD.

When the communication apparatus shown in FIG. 19 is configured to perform the STA MLD the method performed by in the method embodiment described in FIG. 8:
the communication unit 101 is configured to send the multi-link association request frame, where
the communication unit 101 is further configured to receive a multi-link association response frame, and
the multi-link association response frame carries link establishment status information, and the link establishment status information is used to indicate a link establishment status of each link that the STA MLD requests to establish.

When the communication apparatus shown in FIG. 19 is configured to perform the AP MLD the method performed by in the method embodiment described in FIG. 8:
the communication unit 101 is configured to receive a multi-link association request frame, where
the communication unit 101 is further configured to send a multi-link association response frame, and
the multi-link association response frame carries link establishment status information, and the link establishment status information is used to indicate a link establishment status of each link that a STA MLD requests to establish.

The following describes one or more implementations applicable to the STA MLD and the AP MLD in the method embodiment described in FIG. 8.

In an implementation, the link establishment status information includes a status code field and link configuration information of a successfully established link in the links that the STA MLD requests to establish. The status code field is used to indicate that the STA MLD is successfully associated with the AP MLD.

In another implementation, the link establishment status information includes a status code field and link configuration information of a successfully established link in the links that the STA MLD requests to establish; and
the status code field is used to indicate that a part of the links that the STA MLD requests to establish are successfully established.

In still another implementation, the link establishment status information includes a status code field and link configuration information of a successfully established non-transmitted link in the links that the STA MLD requests to establish; and
the status code field is used to indicate that a transmitted link in the links that the STA MLD requests to establish is successfully established.

In still another implementation, the link establishment status information includes a plurality of status code fields, and one status code field corresponds to one link that the STA MLD requests to establish; and
the status code field is used to indicate a link establishment status of the corresponding link.

In still another implementation, in the links that the STA MLD requests to establish, a status code field of a transmitted link is carried in multi-link device information in a multi-link element, and a status code field of a non-transmitted link is carried in link configuration information of the non-transmitted link in the multi-link element; or in the links that the STA MLD requests to establish, status code fields of all the links are carried in multi-link device information in a multi-link element.

In still another implementation, the link establishment status information includes a status code field and link establishment status bitmap information, and the status code field is used to indicate that the STA MLD is successfully associated with the AP MLD; and
the link establishment status bitmap information is used to indicate whether each link that the STA MLD requests to establish is successfully established.

In still another implementation, the link establishment status information includes a status code field and link establishment status bitmap information;
the status code field is used to indicate that a part of the links that the STA MLD requests to establish are successfully established; and
the link establishment status bitmap information is used to indicate whether each link that the STA MLD requests to establish is successfully established.

In still another implementation, the link establishment status information includes a status code field and link establishment status bitmap information;
the status code field is used to indicate that a transmitted link in the links that the STA MLD requests to establish is successfully established; and
the link establishment status bitmap information is used to indicate whether each non-transmitted link that the STA MLD requests to establish is successfully established.

In still another implementation, the link establishment status bitmap information is carried in multi-link device information in a multi-link element in the multi-link association response frame.

In still another implementation, when the communication apparatus shown in FIG. 19 is configured to perform the STA MLD the method performed by in the method embodiment described in FIG. 13:

the communication unit 101 is further configured to send a reassociation request frame, and the communication unit 101 is further configured to receive a reassociation response frame; and the processing unit 102 is configured to reserve first configuration information and delete second configuration information according to a predefined rule.

Figure 14:
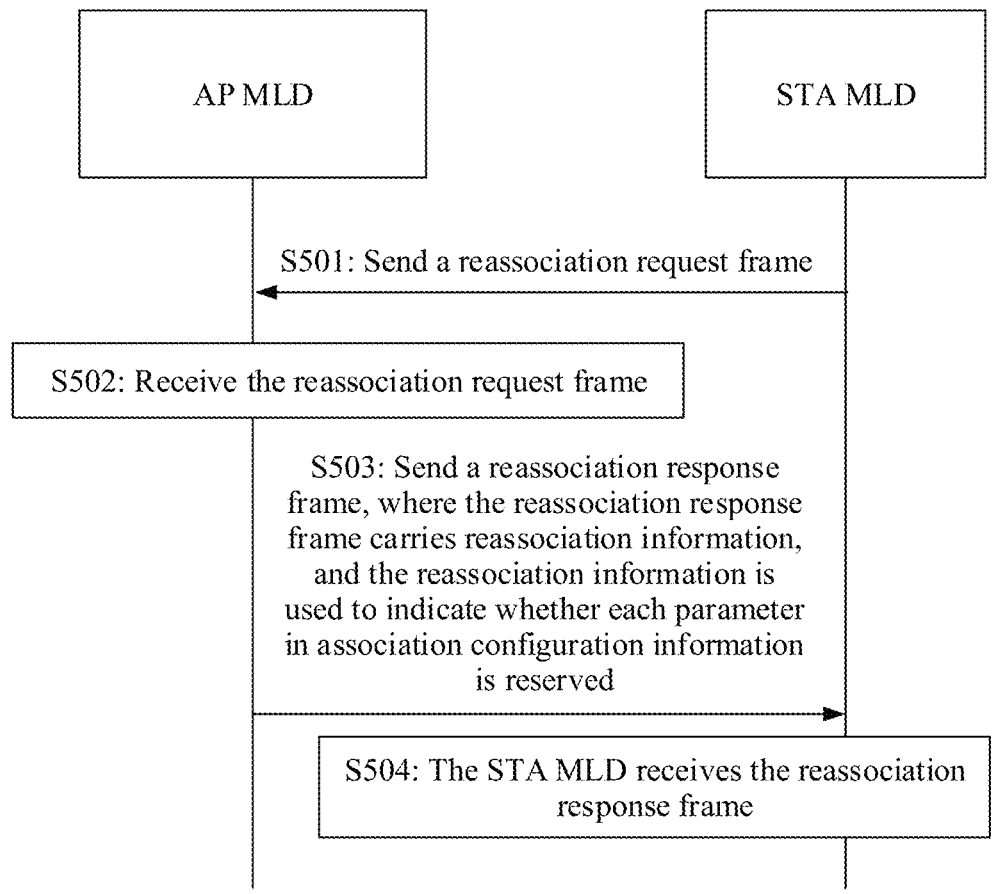
FIG. 14 is a schematic flowchart of a multi-link establishment method 500 according to an embodiment of this application.

In still another implementation, when the communication apparatus shown in FIG. 19 is configured to perform the STA MLD the method performed by in the method embodiment described in FIG. 14:

the communication unit 101 is further configured to send a reassociation request frame, and the communication unit 101 is further configured to receive a reassociation response frame; and the reassociation response frame carries reassociation information, and the reassociation information is used to indicate whether each parameter in association configuration information is reserved.

When the communication apparatus shown in FIG. 19 is configured to perform the AP MLD the method performed by in the method embodiment described in FIG. 14:

the communication unit is further configured to receive a reassociation request frame, and the communication unit is further configured to send a reassociation response frame, where the reassociation response frame carries reassociation information, and the reassociation information is used to indicate whether each parameter in association configuration information is reserved.

The following describes one or more implementations applicable to the STA MLD and the AP MLD in the method embodiment described in FIG. 14.

In an implementation, the association configuration information includes one or more of the following parameters:

a block acknowledgment protocol, a sequence number, a packet number, a duplicate detection cache, a fragmentation and reassembly buffer, and a buffered media access control service data unit MSDU.

In an implementation, the reassociation information includes one or more bits. One bit corresponds to one or more parameters in the association configuration information, and the bit is used to indicate whether the corresponding one or more parameters are reserved.

In an implementation, the reassociation information is carried in multi-link device information in a multi-link element in the reassociation response frame.

Figure 20:
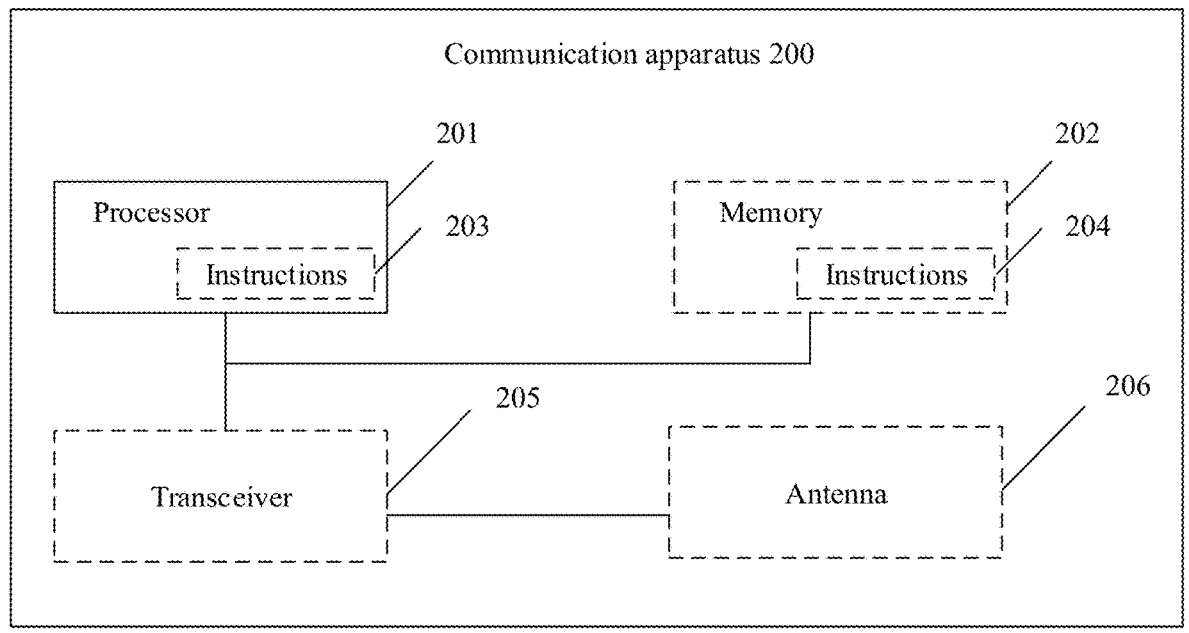
FIG. 20 is a schematic diagram of a structure of a communication apparatus 200 according to an embodiment of this application.

FIG. 20 is a schematic block diagram of a communication apparatus 200. In an implementation, the communication apparatus 200 corresponds to the AP MLD applicable to any one of the multi-link establishment method 100 to the multi-link establishment method 500. Optionally, the communication apparatus 200 may be the station 101 in FIG. 1, or the AP MLD in FIG. 2. Optionally, the communication apparatus 200 is a chip, a chip system, a processor, or the like that implements the foregoing method embodiments. The communication apparatus 200 may be configured to implement the methods described in the foregoing method embodiments. For details, refer to the descriptions in the foregoing method embodiments.

In another implementation, the communication apparatus 200 corresponds to the STA MLD applicable to any one of the multi-link establishment method 100 to the multi-link establishment method 500. Alternatively, the communication apparatus 200 is the station 102 in FIG. 1 or an apparatus thereof. Alternatively, the communication apparatus 200 is the STA MLD in FIG. 2. Optionally, the communication apparatus 200 is a chip, a chip system, a processor, or the like that implements the foregoing method embodiments. The communication apparatus 200 may be configured to implement the methods described in the foregoing method embodiments. For details, refer to the descriptions in the foregoing method embodiments.

The communication apparatus 200 may include one or more processors 201. The processor 201 may be a general purpose processor, a dedicated processor, or the like. For example, the processor 201 may be a baseband processor or a central processing unit. The baseband processor may be configured to process a communication protocol and communication data, and the central processing unit may be configured to control a communication apparatus (for example, a base station, a baseband chip, a terminal, a terminal chip, a DU, or a CU) to execute a computer program, to process data of the computer program.

The communication apparatus 200 may further include a transceiver 205. The transceiver 205 may be referred to as a transceiver unit, a transceiver, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communication apparatus 200 may further include an antenna 206.

Optionally, the communication apparatus 200 may include one or more memories 202, and the memory 202 may store instructions 204. The instructions 204 may be a computer program. The computer program may be run on the communication apparatus 200, to enable the communication apparatus 200 to perform the methods described in the foregoing method embodiments. Optionally, the memory 202 may further store data. The communication apparatus 200 and the memory 202 may be separately disposed, or may be integrated.

When the communication apparatus 200 is configured to implement a function of the STA MLD in any one of the multi-link establishment method 100 to the multi-link establishment method 500 in the foregoing method embodiments:

the processor 201 may be configured to determine a multi-link association request frame.

The transceiver 205 is configured to perform steps S101 and S104 in FIG. 4; steps S201 and S204 in FIG. 6; steps S301 and S304 in FIG. 8; steps S401 and S404 in FIG. 13; or steps S501 and S504 in FIG. 14.

When the communication apparatus 200 is configured to implement a function of the AP MLD in any one of the multi-link establishment method 100 to the multi-link establishment method 500 in the foregoing method embodiments:

the processor 201 may be configured to determine a multi-link association response frame.

The transceiver 205 is configured to perform steps S102 and S103 in FIG. 4; steps S202 and S203 in FIG. 6; steps S302 and S303 in FIG. 8; steps S402 and S403 in FIG. 13; or steps S502 and S503 in FIG. 14.

In an implementation, the processor 201 may include a transceiver configured to implement a receiving function and a sending function. For example, the transceiver may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In an implementation, the processor 201 may store instructions 203. The instructions may be a computer program. The computer program 203 is run on the processor 201, to enable the communication apparatus 200 to perform the methods described in the foregoing method embodiments. The computer program 203 may be fixed in the processor 201, and in this case, the processor 201 may be implemented by hardware.

In an implementation, the communication apparatus 200 may include a circuit, and the circuit may implement a sending, receiving, or communication function in the foregoing method embodiments. The processor and the transceiver described in this application may be implemented in an integrated circuit (IC), an analog IC, a radio frequency integrated circuit RFIC, a mixed-signal IC, an application-specific integrated circuit (ASIC), or a printed circuit board (PCB), an electronic device, and the like. The processor and the transceiver may alternatively be manufactured by using various IC process technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), silicon germanium (SiGe), and gallium arsenide (GaAs).

The communication apparatus described in the foregoing embodiment may be an AP MLD or an AP in the AP MLD. However, a scope of the communication apparatus described in this application is not limited thereto, and a structure of the communication apparatus may not be limited by FIG. 20. The communication apparatus may be an independent device or may be a part of a relatively large device. For example, the communication apparatus may be:

(1) an independent integrated circuit IC, a chip, or a chip system or subsystem;
(2) a set including one or more ICs, where optionally, the IC set may further include a storage component configured to store data and a computer program;
(3) an ASIC, for example, a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) others, or the like.

Figure 21:
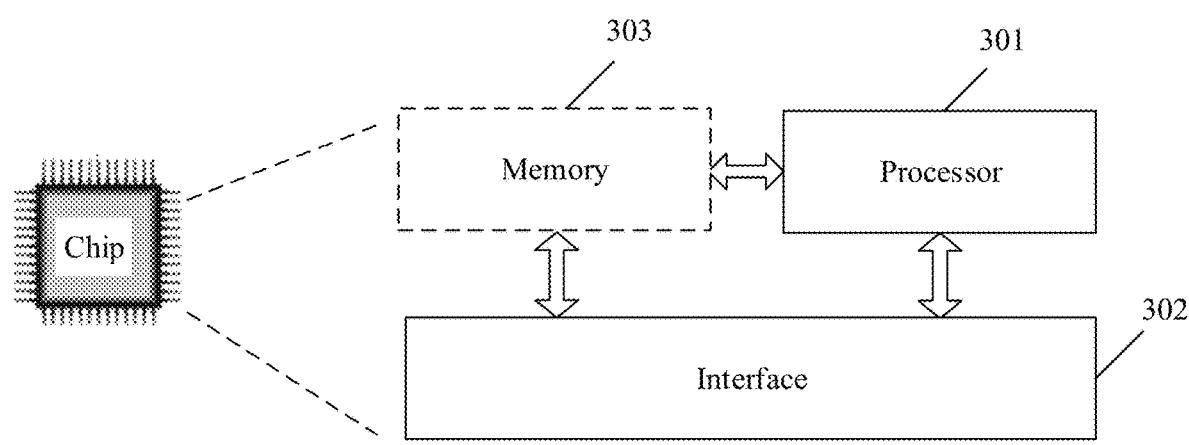
FIG. 21 is a schematic diagram of a structure of a chip according to an embodiment of this application.

For a case in which the communication apparatus may be a chip or a chip system, refer to a schematic diagram of a structure of a chip shown in FIG. 21. The chip shown in FIG. 21 includes a processor 301 and an interface 302. There may be one or more processors 301, and there may be a plurality of interfaces 302.

When the chip is configured to implement a function of an AP in the AP MLD in any one of the multi-link establishment method 100 to the multi-link establishment method 500 in the foregoing method embodiments:
the processor 301 may determine a multi-link association request frame.

The interface 302 is configured to perform steps S101 and S104 in FIG. 4; steps S201 and S204 in FIG. 6; steps S301 and S304 in FIG. 8; steps S401 and S404 in FIG. 13; or steps S501 and S504 in FIG. 14.

When the chip is configured to implement a function of an AP in the AP MLD in any one of the multi-link establishment method 100 to the multi-link establishment method 500 in the foregoing method embodiments:
the processor 301 may determine a multi-link association response frame.

The interface 302 is configured to perform steps S102 and S103 in FIG. 4; steps S202 and S203 in FIG. 6; steps S302 and S303 in FIG. 8; steps S402 and S403 in FIG. 13; or steps S502 and S503 in FIG. 14.

A person skilled in the art may further understand that various illustrative logical blocks and steps (step) that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

This application further provides a computer-readable storage medium. The computer-readable storage medium stores a computer program, and when the computer-readable storage medium is executed by a computer, a function of any one of the foregoing method embodiments is implemented.

This application further provides a computer program product. When the computer program product is executed by a computer, a function of any one of the foregoing method embodiments is implemented.

All or some of the foregoing embodiments may be implemented by using software, hardware, firmware, or any combination thereof. When software is used for implementation, all or some of the embodiments may be implemented in a form of a computer program product. The computer program product includes one or more computer programs. When the computer program is loaded and executed on a computer, the procedures or functions according to the embodiments of this application are all or partially generated. The computer may be a general-purpose computer, a dedicated computer, a computer network, or another programmable apparatus. The computer program may be stored in a computer-readable storage medium or may be transmitted from a computer-readable storage medium to another computer-readable storage medium. For example, the computer program may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid-state drive (SSD)), or the like.

A person of ordinary skill in the art may understand that various reference numerals such as "first" and "second" in this application are merely used for differentiation for ease of description, and are not used to limit a scope of the embodiments of this application, or represent a sequence.

"The at least one" in this application may alternatively be described as one or more, and "the plurality of" means two, three, four, or more. This is not limited in this application. In the embodiments of this application, "first", "second", "third", "A", "B", "C", "D", and the like are used for distinguishing between technical features described by them. There is no chronological order or no size order between the technical features described by "first", "second", "third", "A", "B", "C", and "D".

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described systems, apparatuses, and units, refer to a corresponding process in the foregoing method embodiment.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A communication apparatus, configured to be used in a station multi-link device (STA MLD), wherein the communication apparatus comprises:
a processor coupled to a memory configured to store program instructions for execution by the processor, wherein when executing the program instructions, the communication apparatus is configured to:
send a multi-link association request frame; and
receive a multi-link association response frame;
wherein the multi-link association response frame carries link establishment status information, and the link establishment status information indicates link establishment statuses of at least two links that the STA MLD requests to establish, wherein the link establishment status information comprises at least two status code fields, and one of the status code fields indicates an establishment status of one of the at least two links that the STA MLD requests to establish,
wherein the at least two links that the STA MLD requests to establish comprise a transmitted link and at least one non-transmitted link, the transmitted link is a link on which the multi-link association request frame is transmitted, and the non-transmitted link is a link other than the link on which the multi-link association request frame is transmitted.

2. The communication apparatus according to claim 1, wherein a status code field of the transmitted link is carried in the multi-link association response frame.

3. The communication apparatus according to claim 1, wherein the multi-link association response frame comprises a multi-link element, and the multi-link element comprises multi-link device information and link configuration information of the at least one non-transmitted link, wherein a status code field of the non-transmitted link is carried in the link configuration information of the non-transmitted link.

4. The communication apparatus according to claim 3, wherein the link configuration information further comprises a link identifier indicating a value of a link, and the link configuration information indicates information related to the link.

5. A multi-link establishment method, configured to be used in a station multi-link device (STA MLD), wherein the method comprises:
sending a multi-link association request frame; and
receiving a multi-link association response frame, wherein
the multi-link association response frame carries link establishment status information, and the link establishment status information is indicates link establishment statuses of at least two links that the STA MLD requests to establish, wherein the link establishment status information comprises at least two status code fields, and one of the status code fields indicates an establishment status of one of the at least two links that the STA MLD requests to establish,
wherein the at least two links that the STA MLD requests to establish comprise a transmitted link and at least one non-transmitted link, the transmitted link is a link on which the multi-link association request frame is transmitted, and the non-transmitted link is a link other than the link on which the multi-link association request frame is transmitted.

6. The method according to claim 5, wherein a status code field of the transmitted link is carried in the multi-link association response frame.

7. The method according to claim 5, wherein the multi-link association response frame comprises a multi-link element, and the multi-link element comprises multi-link device information and link configuration information of the at least one non-transmitted link, wherein a status code field of the non-transmitted link is carried in the link configuration information of the non-transmitted link.

8. The method according to claim 7, wherein the link configuration information further comprises a link identifier indicating a value of a link, and the link configuration information indicates information related to the link.

9. A chip, comprising an interface and a processor, wherein the interface is coupled to the processor, wherein the processor is configured to:
- send a multi-link association request frame; and
- receive a multi-link association response frame;
- wherein the multi-link association response frame carries link establishment status information, and the link establishment status information indicates link establishment statuses of at least two links that the chip requests to establish, wherein the link establishment status information comprises at least two status code fields, and one of the status code fields indicates an establishment status of one of the at least two links that the STA MLD requests to establish,
- wherein the at least two links that the STA MLD requests to establish comprise a transmitted link and at least one non-transmitted link, the transmitted link is a link on which the multi-link association request frame is transmitted, and the non-transmitted link is a link other than the link on which the multi-link association request frame is transmitted.

10. The chip according to claim 9, wherein a status code field of the transmitted link is carried in the multi-link association response frame.

11. The chip according to claim 9, wherein the multi-link association response frame comprises a multi-link element, and the multi-link element comprises multi-link device information and link configuration information of the at least one non-transmitted link, wherein a status code field of the non-transmitted link is carried in the link configuration information of the non-transmitted link.

12. The chip according to claim 11, wherein the link configuration information further comprises a link identifier indicating a value of a link, and the link configuration information indicates information related to the link.

13. A non-transitory computer-readable media storing computer instructions, that when executed by one or more processors of a station multi-link device (STA MLD), cause the one or more processors to perform the steps of:
- send a multi-link association request frame; and
- receive a multi-link association response frame;
- wherein the multi-link association response frame carries link establishment status information, and the link establishment status information indicates link establishment statuses of at least two links that the STA MLD requests to establish, wherein the link establishment status information comprises at least two status code fields, and one of the status code fields indicates an establishment status of one of the at least two links that the STA MLD requests to establish;
- wherein the at least two links that the STA MLD requests to establish comprise a transmitted link and at least one non-transmitted link, the transmitted link is a link on which the multi-link association request frame is transmitted, and the non-transmitted link is a link other than the link on which the multi-link association request frame is transmitted.

14. The non-transitory computer-readable media according to claim 13, wherein a status code field of the transmitted link is carried in the multi-link association response frame.

15. The non-transitory computer-readable media according to claim 13, wherein the multi-link association response frame comprises a multi-link element, and the multi-link element comprises multi-link device information and link configuration information of the at least one non-transmitted link, wherein a status code field of the non-transmitted link is carried in the link configuration information of the non-transmitted link.

16. The non-transitory computer-readable media according to claim 15, wherein the link configuration information further comprises a link identifier indicating a value of a link, and the link configuration information indicates information related to the link.

* * * * *